United States Patent
Wade et al.

(10) Patent No.: US 9,165,139 B2
(45) Date of Patent: *Oct. 20, 2015

(54) SYSTEM AND METHOD FOR CREATING SECURE APPLICATIONS

(71) Applicant: OpenPeak Inc., Boca Raton, FL (US)

(72) Inventors: Christopher Michael Wade, Delray Beach, FL (US); Danilo Tan, Austin, TX (US); John R. Brown, Boynton Beach, FL (US); Paul Krzyzanowski, Flemington, NJ (US); Daniel Gittleman, Boca Raton, FL (US); Robert M. Dare, Sunrise, FL (US)

(73) Assignee: OPENPEAK INC., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,208

(22) Filed: May 12, 2015

(65) Prior Publication Data

US 2015/0254457 A1    Sep. 10, 2015

Related U.S. Application Data

(63) Continuation of application No. 14/189,709, filed on Feb. 25, 2014, which is a continuation of application No. 13/626,470, filed on Sep. 25, 2012, now Pat. No. 8,695,060.

(60) Provisional application No. 61/545,548, filed on Oct. 10, 2011, provisional application No. 61/609,246, filed on Mar. 9, 2012.

(51) Int. Cl.
*H04L 9/00* (2006.01)
*G06F 21/54* (2013.01)
(Continued)

(52) U.S. Cl.
CPC ............... *G06F 21/54* (2013.01); *G06F 21/53* (2013.01); *G06F 21/62* (2013.01); *H04L 63/0272* (2013.01); *G06F 2221/033* (2013.01)

(58) Field of Classification Search
CPC ....... G06F 21/10; G06F 21/105; G06F 21/12; G06F 21/121; G06F 21/125; G06F 21/629; G06F 21/64; G06F 2221/033; G06F 21/62; H04L 63/20; H04L 63/0272
USPC ........ 726/1, 22–26, 30–33, 15; 713/161, 165, 713/167, 187; 705/57–59
See application file for complete search history.

(56) References Cited

U.S. PATENT DOCUMENTS 5,265,951 A   11/1993  Kumar
5,294,782 A    3/1994  Kumar (Continued)

FOREIGN PATENT DOCUMENTS

KR    100984639 B1    6/2006
WO       970551 A1    2/1997

(Continued)

OTHER PUBLICATIONS

International Search Report for Int'l Appln. No. PCT/US2011/038184, mailed on Aug. 26, 2011, 2 pages.

(Continued)

*Primary Examiner* — Hosuk Song

(57) ABSTRACT

A method for generating a secure application is described herein. The method can include the steps of obtaining a target application and decomposing the target application into original files that contain predictable instructions. One or more predictable instructions in the original files may be identified. In addition, the target application may be modified to create the secure application by binding one or more intercepts to the target application. These intercepts can enable the modification of the predictable instructions in accordance with one or more policies such that the behavior of the secure application is different from the original behavior of the target application. Modification of the target application may be conducted without access to the source code of the target application.

23 Claims, 15 Drawing Sheets

(51) Int. Cl.
　　G06F 21/53　　　(2013.01)
　　G06F 21/62　　　(2013.01)
　　H04L 29/06　　　(2006.01)

(56) References Cited

U.S. PATENT DOCUMENTS

| | | | |
|---|---|---|---|
| 5,357,585 A | 10/1994 | Kumar | |
| 5,381,348 A | 1/1995 | Ernst et al. | |
| 5,386,106 A | 1/1995 | Kumar | |
| 5,484,989 A | 1/1996 | Kumar et al. | |
| 5,489,001 A | 2/1996 | Yang | |
| 5,489,773 A | 2/1996 | Kumar | |
| 5,519,783 A | 5/1996 | Kumar | |
| 5,521,369 A | 5/1996 | Kumar | |
| 5,548,477 A | 8/1996 | Kumar et al. | |
| 5,548,478 A | 8/1996 | Kumar et al. | |
| 5,616,906 A | 4/1997 | Kumar | |
| 5,632,373 A | 5/1997 | Kumar et al. | |
| 5,638,257 A | 6/1997 | Kumar et al. | |
| 5,648,760 A | 7/1997 | Kumar | |
| 5,696,496 A | 12/1997 | Kumar | |
| 5,708,560 A | 1/1998 | Kumar et al. | |
| 5,774,869 A | 6/1998 | Toader | |
| 5,872,699 A | 2/1999 | Nishii et al. | |
| 5,902,991 A | 5/1999 | Kumar | |
| 5,925,873 A | 7/1999 | Kumar | |
| 6,023,721 A | 2/2000 | Cummings | |
| 6,027,021 A | 2/2000 | Kumar | |
| 6,052,709 A | 4/2000 | Paul | |
| 6,072,401 A | 6/2000 | Kumar | |
| 6,084,769 A | 7/2000 | Moore et al. | |
| 6,104,451 A | 8/2000 | Matsuoka et al. | |
| 6,151,606 A | 11/2000 | Mendez | |
| 6,181,553 B1 | 1/2001 | Cipolla et al. | |
| 6,223,815 B1 | 5/2001 | Shibasaki | |
| 6,266,539 B1 | 7/2001 | Pardo | |
| 6,275,983 B1 | 8/2001 | Orton et al. | |
| 6,276,448 B1 | 8/2001 | Maruno | |
| 6,397,246 B1 | 5/2002 | Wolfe | |
| 6,449,149 B1 | 9/2002 | Ohashi et al. | |
| 6,457,030 B1 | 9/2002 | Adams et al. | |
| 6,473,768 B1 | 10/2002 | Srivastava et al. | |
| 6,571,221 B1 | 5/2003 | Stewart et al. | |
| 6,609,199 B1 | 8/2003 | DeTreville | |
| 6,647,103 B2 | 11/2003 | Pinard et al. | |
| 6,674,640 B2 | 1/2004 | Pokharna et al. | |
| 6,681,238 B1 | 1/2004 | Brice, Jr. et al. | |
| 6,708,221 B1 | 3/2004 | Mendez et al. | |
| 6,799,277 B2 | 9/2004 | Colvin | |
| 6,952,617 B1 | 10/2005 | Kumar | |
| 6,952,671 B1 | 10/2005 | Kolesnik et al. | |
| 6,983,311 B1 | 1/2006 | Haitsuka et al. | |
| 7,039,041 B2 | 5/2006 | Robohm et al. | |
| 7,058,088 B2 | 6/2006 | Tomita et al. | |
| 7,120,462 B2 | 10/2006 | Kumar | |
| 7,130,193 B2 | 10/2006 | Hirafuji et al. | |
| 7,149,543 B2 | 12/2006 | Kumar | |
| 7,184,801 B2 | 2/2007 | Farcasiu | |
| 7,236,770 B2 | 6/2007 | Sankaramanchi | |
| 7,243,163 B1 | 7/2007 | Friend et al. | |
| 7,275,073 B2 | 9/2007 | Ganji et al. | |
| 7,301,767 B2 | 11/2007 | Takenoshita et al. | |
| 7,392,531 B2 | 6/2008 | Thurston et al. | |
| 7,447,799 B2 | 11/2008 | Kushner | |
| 7,552,196 B2 | 6/2009 | Levi et al. | |
| 7,574,177 B2 | 8/2009 | Tupman et al. | |
| 7,574,200 B2 | 8/2009 | Hassan et al. | |
| 7,577,462 B2 | 8/2009 | Kumar | |
| 7,620,001 B2 | 11/2009 | Ganji | |
| 7,620,392 B1 | 11/2009 | Maurya et al. | |
| 7,627,343 B2 | 12/2009 | Fadell et al. | |
| 7,688,952 B2 | 3/2010 | Light et al. | |
| 7,702,322 B1 | 4/2010 | Maurya et al. | |
| 7,778,035 B2 | 8/2010 | Huang et al. | |
| 7,788,382 B1 | 8/2010 | Jones et al. | |
| 7,821,984 B2 | 10/2010 | Wilson | |
| 7,823,214 B2 | 10/2010 | Rubinstein et al. | |
| 7,869,789 B2 | 1/2011 | Hassan et al. | |
| 7,885,645 B2 | 2/2011 | Postma et al. | |
| 7,890,091 B2 | 2/2011 | Puskoor et al. | |
| 7,912,994 B2 | 3/2011 | Cornwell et al. | |
| 7,958,245 B2 | 6/2011 | Thomas et al. | |
| 7,970,386 B2 | 6/2011 | Bhat et al. | |
| 7,992,084 B2 | 8/2011 | Ozawa | |
| 8,000,736 B2 | 8/2011 | Forstall et al. | |
| 8,010,701 B2 | 8/2011 | Wilkinson et al. | |
| 8,012,219 B2 | 9/2011 | Mendez et al. | |
| 8,015,432 B1 | 9/2011 | Vaidya | |
| 8,054,211 B2 | 11/2011 | Vidal | |
| 8,060,074 B2 | 11/2011 | Danford et al. | |
| 8,078,157 B2 | 12/2011 | Maurya et al. | |
| 8,078,739 B1 | 12/2011 | Somasundaram et al. | |
| 8,086,332 B2 | 12/2011 | Dorogusker et al. | |
| 8,099,090 B2 | 1/2012 | Postma et al. | |
| 8,099,541 B2 | 1/2012 | Serebrin | |
| 8,180,893 B1 | 5/2012 | Spertus | |
| 8,181,264 B2 | 5/2012 | Linn et al. | |
| 8,185,149 B2 | 5/2012 | Forstall et al. | |
| 8,199,507 B2 | 6/2012 | Shohet et al. | |
| 8,254,902 B2 | 8/2012 | Bell et al. | |
| 8,272,048 B2 | 9/2012 | Cooper et al. | |
| 8,375,369 B2 | 2/2013 | Mensch et al. | |
| 8,484,728 B2 | 7/2013 | De Atley et al. | |
| 8,549,656 B2 | 10/2013 | Blaisdell et al. | |
| 8,601,579 B2 | 12/2013 | Kristic et al. | |
| 8,689,279 B2* | 4/2014 | Basmov et al. | 726/1 |
| 8,693,358 B2 | 4/2014 | Hodges | |
| 8,695,060 B2 | 4/2014 | Wade et al. | |
| 8,769,063 B2* | 7/2014 | Barton et al. | 709/221 |
| 8,831,517 B2 | 9/2014 | Shankaranarayanan | |
| 8,832,652 B2 | 9/2014 | Mueller et al. | |
| 8,850,424 B2 | 9/2014 | Friedman et al. | |
| 8,869,235 B2* | 10/2014 | Qureshi et al. | 726/1 |
| 8,893,261 B2 | 11/2014 | Fainkichen et al. | |
| 8,893,298 B2 | 11/2014 | Roark et al. | |
| 8,924,970 B2 | 12/2014 | Newell | |
| 8,938,547 B1 | 1/2015 | Roberge et al. | |
| 8,955,068 B1 | 2/2015 | Venkataramani et al. | |
| 8,955,152 B1 | 2/2015 | Enderwick et al. | |
| 8,959,579 B2 | 2/2015 | Barton et al. | |
| 8,966,574 B2 | 2/2015 | Kiehtreiber et al. | |
| 8,977,842 B1 | 3/2015 | McCorkendale et al. | |
| 8,978,110 B2 | 3/2015 | Dabbiere et al. | |
| 8,984,657 B2 | 3/2015 | Nerger et al. | |
| 8,990,116 B2 | 3/2015 | Ferino et al. | |
| 8,990,901 B2 | 3/2015 | Aravindakshan et al. | |
| 8,990,920 B2 | 3/2015 | Pontillo et al. | |
| 2001/0047363 A1 | 11/2001 | Peng | |
| 2002/0013852 A1 | 1/2002 | Janik | |
| 2002/0032609 A1 | 3/2002 | Wilkman | |
| 2002/0103879 A1 | 8/2002 | Mondragon | |
| 2002/0131404 A1 | 9/2002 | Mehta et al. | |
| 2002/0133534 A1 | 9/2002 | Forslow | |
| 2002/0172336 A1 | 11/2002 | Postma et al. | |
| 2003/0002637 A1 | 1/2003 | Miyauchi et al. | |
| 2003/0083988 A1 | 5/2003 | Reith | |
| 2003/0090864 A1 | 5/2003 | Kuo | |
| 2003/0130984 A1 | 7/2003 | Quinlan et al. | |
| 2003/0177207 A1 | 9/2003 | Nagasaka et al. | |
| 2003/0229718 A1 | 12/2003 | Tock et al. | |
| 2004/0019675 A1 | 1/2004 | Hebeler et al. | |
| 2004/0030887 A1 | 2/2004 | Harrisville-Wolff et al. | |
| 2004/0034853 A1 | 2/2004 | Gibbons et al. | |
| 2004/0047348 A1 | 3/2004 | O'Neill | |
| 2004/0052343 A1 | 3/2004 | Glaser et al. | |
| 2004/0060687 A1 | 4/2004 | Moss, II | |
| 2004/0078812 A1 | 4/2004 | Calvert | |
| 2004/0083125 A1 | 4/2004 | Almeida et al. | |
| 2004/0098449 A1 | 5/2004 | Bar-Lavi et al. | |
| 2004/0128665 A1 | 7/2004 | Gouleau et al. | |
| 2004/0139170 A1 | 7/2004 | Shen et al. | |
| 2004/0162092 A1 | 8/2004 | Marsico et al. | |
| 2004/0190256 A1 | 9/2004 | Genova et al. | |
| 2005/0107114 A1 | 5/2005 | Ocock | |

(56) References Cited

U.S. PATENT DOCUMENTS

| | | |
|---|---|---|
| 2005/0120331 A1 | 6/2005 | Asare et al. |
| 2005/0131885 A1 | 6/2005 | Komatsu et al. |
| 2005/0144445 A1 | 6/2005 | Yeap et al. |
| 2005/0149726 A1 | 7/2005 | Joshi et al. |
| 2005/0177506 A1 | 8/2005 | Rissanen |
| 2005/0188318 A1 | 8/2005 | Tamir et al. |
| 2005/0213331 A1 | 9/2005 | Lewis |
| 2006/0030341 A1 | 2/2006 | Pham |
| 2006/0085645 A1 | 4/2006 | Bangui |
| 2006/0121880 A1 | 6/2006 | Cowsar et al. |
| 2006/0143250 A1 | 6/2006 | Peterson et al. |
| 2006/0184788 A1 | 8/2006 | Sandhu et al. |
| 2006/0200658 A1 | 9/2006 | Penkethman |
| 2006/0277209 A1 | 12/2006 | Kral et al. |
| 2006/0277311 A1 | 12/2006 | Franco et al. |
| 2007/0041536 A1 | 2/2007 | Koskinen et al. |
| 2007/0080823 A1 | 4/2007 | Fu et al. |
| 2007/0093243 A1 | 4/2007 | Kapadekar et al. |
| 2007/0150388 A1 | 6/2007 | Mendiratta et al. |
| 2007/0156870 A1 | 7/2007 | McCollum |
| 2007/0165654 A1 | 7/2007 | Chai et al. |
| 2007/0169105 A1 | 7/2007 | Amberny et al. |
| 2007/0183772 A1 | 8/2007 | Baldwin et al. |
| 2007/0209061 A1 | 9/2007 | Dekeyzer et al. |
| 2007/0239878 A1 | 10/2007 | Bowers et al. |
| 2007/0294380 A1 | 12/2007 | Natarajan et al. |
| 2008/0060085 A1 | 3/2008 | Samzelius et al. |
| 2008/0070495 A1 | 3/2008 | Stricklen et al. |
| 2008/0115225 A1 | 5/2008 | Jogand-Coulomb et al. |
| 2008/0125079 A1 | 5/2008 | O'Neil et al. |
| 2008/0126736 A1 | 5/2008 | Heil |
| 2008/0134325 A1 | 6/2008 | Kim et al. |
| 2008/0140969 A1 | 6/2008 | Lawrence |
| 2008/0201453 A1 | 8/2008 | Assenmacher |
| 2008/0222621 A1 | 9/2008 | Knight et al. |
| 2008/0271014 A1 | 10/2008 | Serebrin et al. |
| 2008/0281953 A1 | 11/2008 | Blaisdell |
| 2008/0287096 A1 | 11/2008 | Aaltonen et al. |
| 2008/0297481 A1 | 12/2008 | Higginson |
| 2008/0299989 A1 | 12/2008 | King et al. |
| 2009/0126017 A1 | 5/2009 | Chahal |
| 2009/0132828 A1 | 5/2009 | Kiester et al. |
| 2009/0150970 A1 | 6/2009 | Hinds et al. |
| 2009/0187726 A1 | 7/2009 | Serebrin et al. |
| 2009/0219899 A1 | 9/2009 | Dostal et al. |
| 2010/0004959 A1 | 1/2010 | Weingrad |
| 2010/0008337 A1 | 1/2010 | Bajko |
| 2010/0042478 A1 | 2/2010 | Reisman |
| 2010/0042990 A1 | 2/2010 | Kinder |
| 2010/0077035 A1 | 3/2010 | Li et al. |
| 2010/0115113 A1 | 5/2010 | Short et al. |
| 2010/0157543 A1 | 6/2010 | Shohet et al. |
| 2010/0157989 A1 | 6/2010 | Krzyzanowski et al. |
| 2010/0157990 A1 | 6/2010 | Krzyzanowski et al. |
| 2010/0159898 A1 | 6/2010 | Krzyzanowski et al. |
| 2010/0180276 A1 | 7/2010 | Jiva |
| 2010/0192207 A1 | 7/2010 | Raleigh |
| 2010/0222097 A1 | 9/2010 | Gisby et al. |
| 2010/0235233 A1 | 9/2010 | Goldberg et al. |
| 2010/0328064 A1 | 12/2010 | Rogel |
| 2010/0330953 A1 | 12/2010 | Rogel et al. |
| 2010/0330961 A1 | 12/2010 | Rogel |
| 2010/0332635 A1 | 12/2010 | Rogel et al. |
| 2010/0333088 A1 | 12/2010 | Rogel et al. |
| 2011/0004941 A1 | 1/2011 | Mendez et al. |
| 2011/0029779 A1 | 2/2011 | Sekiya et al. |
| 2011/0038120 A1 | 2/2011 | Merz et al. |
| 2011/0040607 A1 | 2/2011 | Shkedi |
| 2011/0058052 A1 | 3/2011 | Bolton et al. |
| 2011/0082789 A1 | 4/2011 | Boyd |
| 2011/0082900 A1 | 4/2011 | Nagpal et al. |
| 2011/0093583 A1 | 4/2011 | Piemonte et al. |
| 2011/0145932 A1 | 6/2011 | Nerger et al. |
| 2011/0178863 A1 | 7/2011 | Daigle |
| 2011/0179483 A1 | 7/2011 | Paterson et al. |
| 2011/0208838 A1 | 8/2011 | Thomas et al. |
| 2011/0215949 A1 | 9/2011 | Yarnold et al. |
| 2011/0225252 A1 | 9/2011 | Bhat et al. |
| 2012/0005746 A1 | 1/2012 | Wei et al. |
| 2012/0066223 A1 | 3/2012 | Schentrup et al. |
| 2012/0070017 A1 | 3/2012 | Dorogusker et al. |
| 2012/0079423 A1 | 3/2012 | Bender et al. |
| 2012/0084184 A1 | 4/2012 | Raleigh et al. |
| 2012/0088481 A1 | 4/2012 | Postma et al. |
| 2012/0096364 A1 | 4/2012 | Wilkinson et al. |
| 2012/0096365 A1 | 4/2012 | Wilkinson et al. |
| 2012/0102564 A1 | 4/2012 | Schentrup et al. |
| 2012/0102574 A1 | 4/2012 | Schentrup et al. |
| 2012/0117274 A1 | 5/2012 | Lydon et al. |
| 2012/0144050 A1 | 6/2012 | Shah |
| 2012/0151464 A1 | 6/2012 | Koren et al. |
| 2012/0158829 A1 | 6/2012 | Ahmavaara et al. |
| 2012/0159567 A1 | 6/2012 | Toy et al. |
| 2012/0184282 A1 | 7/2012 | Malkamaki et al. |
| 2012/0185767 A1 | 7/2012 | Schlegel |
| 2012/0185879 A1 | 7/2012 | Van Vechten et al. |
| 2012/0210443 A1 | 8/2012 | Blaisdell et al. |
| 2012/0246484 A1 | 9/2012 | Blaisdell et al. |
| 2012/0246731 A1 | 9/2012 | Blaisdell et al. |
| 2012/0296744 A1 | 11/2012 | Cue et al. |
| 2012/0302204 A1 | 11/2012 | Gupta et al. |
| 2012/0304280 A1 | 11/2012 | Hayashida |
| 2012/0304310 A1 | 11/2012 | Blaisdell |
| 2012/0309348 A1 | 12/2012 | De Atley et al. |
| 2012/0311010 A1 | 12/2012 | Shah |
| 2012/0311697 A1 | 12/2012 | Swingler et al. |
| 2012/0311702 A1 | 12/2012 | Krstic et al. |
| 2012/0324057 A1 | 12/2012 | Macris |
| 2013/0055341 A1 | 2/2013 | Cooper et al. |
| 2013/0063619 A1 | 3/2013 | Asai |
| 2013/0091543 A1 | 4/2013 | Wade |
| 2013/0091557 A1 | 4/2013 | Gurrapu |
| 2013/0117805 A1 | 5/2013 | Kent et al. |
| 2013/0130652 A1 | 5/2013 | Deasy et al. |
| 2013/0132854 A1 | 5/2013 | Raleigh et al. |
| 2013/0132941 A1 | 5/2013 | Lindeman et al. |
| 2013/0145278 A1 | 6/2013 | Newell et al. |
| 2013/0145448 A1 | 6/2013 | Newell |
| 2013/0226669 A1 | 8/2013 | Chiang et al. |
| 2013/0247147 A1 | 9/2013 | Pontillo et al. |
| 2013/0254401 A1 | 9/2013 | Marshall et al. |
| 2013/0260713 A1 | 10/2013 | Toy et al. |
| 2013/0260730 A1 | 10/2013 | Toy et al. |
| 2013/0316703 A1 | 11/2013 | Girard et al. |
| 2014/0006237 A1 | 1/2014 | Chiang et al. |
| 2014/0007222 A1 | 1/2014 | Qureshi et al. |
| 2014/0047532 A1 | 2/2014 | Sowatskey |
| 2014/0059525 A1 | 2/2014 | Jawa et al. |
| 2014/0059573 A1 | 2/2014 | Jawa et al. |
| 2014/0059703 A1 | 2/2014 | Hung et al. |
| 2014/0082641 A1 | 3/2014 | Clark |
| 2014/0089376 A1 | 3/2014 | Caldas et al. |
| 2014/0089487 A1 | 3/2014 | Debate |
| 2014/0173747 A1 | 6/2014 | Govindaraju |
| 2014/0177839 A1 | 6/2014 | Wagner et al. |
| 2014/0181518 A1 | 6/2014 | Kim et al. |
| 2014/0181803 A1 | 6/2014 | Cooper et al. |
| 2014/0208397 A1 | 7/2014 | Peterson |
| 2014/0230008 A1 | 8/2014 | Feroz et al. |
| 2014/0230011 A1 | 8/2014 | Drewry et al. |
| 2014/0250505 A1 | 9/2014 | Kim et al. |
| 2014/0280934 A1 | 9/2014 | Reagan et al. |
| 2014/0280955 A1 | 9/2014 | Stuntebeck et al. |
| 2014/0282828 A1 | 9/2014 | Stuntebeck |
| 2014/0282829 A1 | 9/2014 | Dabbiere et al. |
| 2014/0282846 A1 | 9/2014 | DeWeese et al. |
| 2014/0282869 A1 | 9/2014 | Dabbiere |
| 2014/0282894 A1 | 9/2014 | Manton |
| 2014/0282897 A1 | 9/2014 | Stuntebeck |
| 2014/0282929 A1 | 9/2014 | Tse |
| 2014/0317679 A1 | 10/2014 | Wade et al. |
| 2014/0337528 A1 | 11/2014 | Barton et al. |

(56) References Cited

U.S. PATENT DOCUMENTS

| | | | |
|---|---|---|---|
| 2015/0019994 A1 | 1/2015 | Freudenthaler et al. |
| 2015/0033324 A1 | 1/2015 | Fainkichen et al. |
| 2015/0109967 A1 | 4/2015 | Hogan et al. |

FOREIGN PATENT DOCUMENTS

| | | |
|---|---|---|
| WO | 2010080498 A1 | 7/2010 |
| WO | 2010080500 A1 | 7/2010 |
| WO | 2012024418 A1 | 2/2012 |
| WO | 2012037064 A1 | 3/2012 |
| WO | 2012061046 A2 | 5/2012 |
| WO | 2012061047 A1 | 5/2012 |
| WO | 2012064870 A2 | 5/2012 |
| WO | 2013050602 A1 | 4/2013 |

OTHER PUBLICATIONS

International Search Report and Written Opinion for Int'l Appln No. PCT/US2011/060023, mailed on May 25, 2012, 10 pages.

International Search Report and Written Opinion for Int'l Appln No. PCT/US2011/048109 mailed on Dec. 2, 2011, 10 pages.

International Search Report and Written Opinion for Int'l Appln No. PCT/US2012/045923, mailed on Oct. 4, 2012, 8 pages.

A Closer Look at Horizon App Manager Printout from Website: http://www.horizonmanager.com/?page_id=211 Copyright 2011 VMware, Inc.

Fulton, S.M., "Xerox Goes Up Against RIM in 'BYOD' Mobile Device Management," dated Feb. 22, 2012 [retrieved Aug. 2, 2012] retrieved from the Internet: <http://www.readwriteweb.com/cloud/2012/02/xerox-goes-up-against-rim-in-b.php>, 4 pgs.

International Search Report and Written Opinions for International Patent Application No. PCT/US2012/058689, mailed on Mar. 21, 2013, 13 pages.

Non-Final Office Action for U.S. Appl. No. 13/626,470, dated Jan. 6, 2014, 7 pages.

Amendment and Reply for U.S. Appl. No. 13/626,470, mailed Jan. 16, 2014, 21 pages.

International Search Report and Written Opinion for International Application No. PCT/US2009/068475, mailed on Apr. 23, 2010, 17 pages.

International Search Report and Written Opinion for International Application No. PCT/US2009/068482, mailed on Feb. 23, 2010, 12 pages.

International Search Report and Written Opinion for International Application No. PCT/US2011/051302, mailed on Jan. 26, 2012, 2 pages.

International Search Report and Written Opinion for International Application No. PCT/US2011/057351, mailed on May 9, 2012, 10 pages.

International Search Report and Written Opinion for International Application No. PCT/US2011/057354, mailed on May 9, 2012, 10 pages.

U.S. Appl. No. 14/608,662, filed Jan. 29, 2015, 42 pages.
U.S. Appl. No. 14/641,795, filed Mar. 9, 2015, 61 pages.
U.S. Appl. No. 14/615,799, filed Feb. 6, 2015, 50 pages.
U S. Appl. No. 14/573,601, filed Dec. 17, 2014, 30 pages.
U.S. Appl. No. 14/658,998, filed Mar. 16, 2015, 41 pages.

Jack Madden, "Good Technology will soon let you bundle mobile data with their email app", Brian Madden, dated Jul. 31, 2014, 2 pages.

Jack Madden, "After mobile app management, the next step for BYOD can be split phone numbers and split billing", Brian Madden, dated Jan. 27, 2015, 2 pages.

U.S. Appl. No. 14/669,120, filed Mar. 26, 2015, 51 pages.

IBM, "Application Protection Inside an Untrusted OS," Feb. 9, 2010, 7 pages.

Non-Final Office Action for U.S. Appl. No. 14/205,686, mailed Dec. 5, 2014, 12 pages.

Non-Final Office Action for U.S. Appl. No. 14/205,661, mailed Dec. 22, 2014, 12 pages.

International Search Report and Written Opinion for International Application No. PCT/US2014/060657, mailed Jan. 29, 2015, 10 pages.

'Multifaceted Resource Management for Dealing with Heterogeneous Workloads in Virtualized Data Centers', 11th IEEE/ACM International Conference on Grid Computing, 2010 pp. 25-32. See abstract and sections I-II.

Extended European Search Report and Search Opinion for European Application No. 12839583.7, mailed Apr. 9, 2015, 6 pages.

International Search Report and Written Opinion for International Application No. PCT/US2014/060838, mailed Apr. 23, 2015, 15 pages.

Amendment and Reply for U.S. Appl. No. 14/205,686, filed May 1, 2015, pages.

Amendment and Reply for U.S. Appl. No. 14/205,661, filed May 1, 2015, 10 pages.

Non-Final Office Action for U.S. Appl. No. 14/641,795, dated May 15, 2015, 16 pages.

Non-Final Office Action in U.S. Appl. No. 14/573,601, mailed Apr. 24, 2015, 18 pages.

Non-Final Office Action for U.S. Appl. No. 14/608,662, mailed Jun. 4, 2015, 19 pages.

U.S. Appl. No. 14/710,208, filed May 12, 2015, 80 pages.

Notice of Allowance and Examiners Amendment for U.S. Appl. No. 14/525,932, mailed Jun. 9, 2015, 14 pages.

Non-Final Office Action for U.S. Appl. No. 14/615,799, Feb. 6, 2015, mailed 9, 2015, 17 pages.

Non-Final Office Action for U.S. Appl. No. 14/658,998, Mar. 16, 2015, mailed 19, 2015, 21 pages.

Notice of Allowance and Examiners Amendment for U.S. Appl. No. 14/689,120, mailed Jun. 25, 2015, 31 pages.

* cited by examiner

9/16/2011

NO SIM CARD.

ONGOING

SWITCH TO PERSONAL MODE
8:50 PM

USB DEBUGGING CONNECTED
SELECT TO DISABLE USB DEBUGGING.

USB CONNECTED
SELECT TO COPY FILES TO/FROM YOUR COMPUTER.

SYSTEM AND METHOD FOR CREATING SECURE APPLICATIONS

CROSS-REFERENCE TO RELATED APPLICATIONS

This application is a continuation of U.S. Patent Application Publication No. 2014/0317679, filed on Feb. 25, 2014, which is a continuation of U.S. Pat. No. 8,695,060, issued on Apr. 8, 2014, which claims priority to U.S. Provisional Patent Application No. 61/545,548, filed on Oct. 10, 2011, and to U.S. Provisional Patent Application No. 61/609,246, filed on Mar. 9, 2012, each of which is incorporated by reference herein in its entirety.

FIELD OF TECHNOLOGY

The present description herein relates to systems and methods for creating secure workspaces and applications, including the management and enhancement of same.

BACKGROUND

As smartphones have evolved over the years, consumers have become increasingly reliant on these devices, particularly when it comes to managing their personal affairs. Many enterprises, however, have resisted putting corporate data on the personal devices of their employees due to potential security breaches. For example, many applications (or "apps) installed on personal devices contain malware or some other questionable code. Currently, information technology (IT) departments have limited ways of managing the personal devices of their employees and the content installed on those devices. As a result, sensitive enterprise data, if installed on an employee's personal device, may be subject to attack from a dishonest source. This potential security breach has led many companies to resist integrating corporate apps and information in the operating environment of a worker's personal mobile device.

SUMMARY

A method for generating a secure application is described herein. The method can include the steps of obtaining a target application and decomposing the target application into original files that contain predictable instructions. A target application may be, for example, a non-secure application that may be available from an application repository. The predictable instructions can be any component or element that makes up the target application and that conform to known platforms. Some non-limiting examples of predictable instructions include opcodes, references, embedded constants or program sequences. These predictable instructions may be searched, and one or more relevant instructions may be identified. In addition, the target application can be modified to create the secure application by binding one or more intercepts to the target application. These intercepts may enable the modification of the predictable instructions in accordance with one or more policies such that the behavior of the secure application is different from the original behavior of the target application. That is, the manner in which a secure application may operate may be tied to a policy that reflects restrictions, directives or guidelines that an entity may wish to have enforced against or applied to the secure application. The modification of the target application may be conducted without access to the source code of the target application. An intercept, for purposes of this description, may be considered as an actual replacement of an existing instruction or a new instruction that may interrupt program flow and conditionally return control to the program flow.

The method can also include the step of repackaging the secure application such that the bound intercepts are integrated with the original files. As a result of this process, the intercepts may be considered to be physically inseparable from the original files following the repacking of the secure application, which can result in an immutable deployable entity. This feature can prevent the secure application from having the intercepts removed by an unauthorized party. In addition, generating the secure application may preserve the operating system interactions that were originally defined for the target application and an operating system for which the target application was designed. This technique can ensure that the secure application, even with the modifications to secure it, will continue to work with its intended operating system and that original behavior that was designed into the target application may still be permitted to be performed with the secure application in keeping with the scope of any acquired policy enforcement mechanisms.

The method may also include the step of imposing a secure and unpredictable namespace on the interprocess communications of the target application as part of modifying the target application to prevent unauthorized interprocess communications. This imposition of the secure and unpredictable namespace may prevent a non-secure application from accessing data associated with the secure application but may allow secure applications to share data among each other. For convenience, the designation of the secure namespace may arise from and be a derivation of the original namespace of the target application, although such a configuration is certainly not meant to be limiting, as virtually any unpredictable namespace may be employed consistent with obfuscation techniques. In one arrangement, the secure application may be part of a secure partition, and the non-secure application may be part of a non-secure partition. As an example, preventing the non-secure application from accessing data associated with the secure application may include preventing the non-secure application from executing a copy and paste operation with respect to the data associated with the secure application.

In one embodiment, the predictable instructions can be byte codes. In this arrangement, modifying the target application may include programmatically injecting secure byte codes in the place of pre-existing byte codes in which the secure byte codes override the pre-existing byte codes. The term "override" means to take priority over, and the behavior of the secure application may be based on the secure byte codes instead of the pre-existing byte codes, in some cases at least until one or more predetermined conditions are met. For example, a behavior of the target application associated with the pre-existing byte codes may still be executed if a policy that is associated with the secure byte codes that override the pre-existing byte codes is satisfied.

In another embodiment, the predictable instructions may be references. Modifying the target application, in this case, can include programmatically injecting secure references in the place of pre-existing references in which the secure references override the pre-existing references. Similar to the byte code injection above, the behavior of the secure application may be based on the secure references instead of the pre-existing references, at least until—in some cases—one or more predetermined conditions are met. For example, a behavior of the target application associated with the pre-existing references may still be executed if a policy that is associated with the secure references that override the pre-existing references is satisfied. In addition, as part of the process, a linking order may be reset or overridden to enable the secure references to take precedence over the pre-existing references such that the secure references override the pre-existing references. In either arrangement, the secure application may be published in an application repository. The application may be a secure application repository that provides access to secure applications, which may require some form of authentication prior to being retrieved from the secure repository.

As an example, the policies, which may (at least in part) determine secure application behavior, can be static or dynamic policies. A dynamic policy may be modified following the creation of the secure application, which can allow for modified behavior of the secure application after such creation. As another example, different policies may exist for different groups of computing devices in relation to the same secure application. As such, an enterprise may develop and enforce a different set of restrictions on the operation of the same secure application for disparate groups of associates.

There are numerous ways in which to control a secure application. For example, the original behavior of the target application may be different from that of the secure application through management of the secure application. Non-limiting examples of the management of the secure application include one or more of the following: (1) preventing operation of the secure application during a predetermined time; (2) preventing operation of the secure application if a computing device on which the secure application is installed is located outside a predetermined location; (3) preventing operation of the secure application if the operation of the secure application would be in non-compliance with an imposed licensing model; (4) uninstalling a secure application; or (5) deleting data that is associated with a secure application.

As another example, the original behavior of the target application may be different from that of the secure application through security features. Non-limiting examples of the security features of the secure application include one or more of the following: (1) encrypting data that the secure application writes to storage; (2) locking or deleting the secure application if a computing device on which the secure application is installed has been offline or disconnected from a network for more than a predetermined amount of time; (3) locking or deleting the secure application if an authentication associated with launching the secure application has been incorrectly presented more than a predetermined number of times; (4) enabling or disabling the ability of the secure application to write data to or retrieve data from external storage; (5) requiring reentry of an authentication if the secure application has been inactive after launch for greater than a predetermined amount of time; (6) forcing an authentication to be entered prior to operation of the secure application; (7) preventing operation of the secure application unless an authentication associated with the secure application meets pre-defined criteria (such as correct password or authorized biometric sample); (8) preventing operation of the secure application if a privileges check determines that an unauthorized modification has been performed on a computing device on which the secure application is installed; or (9) muting notifications from the secure application.

In yet another example, the original behavior of the target application may be different from that of the secure application through previously-unavailable functional features. A previously-unavailable functional feature may be one that was not originally required at the time the target application was developed. Non-limiting examples of the previously-unavailable functional features of the secure application include one or more of the following: (1) enabling the secure application to store data at an external location; (2) replacing an existing video source for the secure application with a new video source in which a new video source at least includes input from a display of a computing device; or (3) enabling the interaction of a new input/output device with the secure application. As an example, the new input/output device may be a mouse.

The process of modifying the target application to create the secure application may apply to multiple target applications to create multiple corresponding secure applications. The multiple secure applications may operate in a substantially similar fashion with respect to the modification, and the multiple secure applications are related to one another. For example, an enterprise may wish to acquire several secure applications in which each secure application encrypts data that is written to storage. This encryption rule may apply to each of the secure applications that the enterprise acquires, and the enterprise (or some entity on behalf of the enterprise) may re-sign the certificates of the secure applications.

Another method for generating a secure application is described herein. The method may include the steps of receiving a pre-compiled target application and identifying predictable instructions in the target application. The method can also include the step of configuring the target application with respect to the predictable instructions to enable selective behavior modification of the target application, thereby creating the secure application. The behavior modification is selective in nature in that it may or may not be carried out, depending on one or more external factors. These external factors may be related to a condition of a computing device on which the secure application is or is to be installed or other policies that are determined by a suitable entity. The configuration may be performed without access to the source code of the target application and may preserve the normal functions and application programming interfaces of an operating system for which the target application was designed.

As an example, configuring the target application may include imposing one or more intercepts on the predictable instructions of the target application. Specifically, the predictable instructions may be non-secure byte codes, and imposing the intercepts on the predictable instructions can include programmatically injecting secure byte codes in the place of the non-secure byte codes. In another arrangement, the predictable instructions may be non-secure references, and imposing the intercepts on the predictable instructions can include programmatically injecting secure references in the place of the non-secure references.

As a result of these intercepts, the method may include the step of automatically interceding in calls to data sharing or data storage application programming interfaces to ensure that data associated with the secure application is processed in a secure fashion. Interceding in the calls to data sharing or data storage application programming interfaces may be part of the behavior modification mentioned above. The method can also include the step of encapsulating the target application as part of the configuration, which can restrict access to the interprocess communications associated with the secure application.

Non-limiting examples of the behavior modification for this method may include one or more of the following: (1) preventing operation of the secure application during a predetermined time; (2) preventing operation of the secure application if a computing device on which the secure application is installed is located outside a predetermined location; (3) preventing operation of the secure application if the operation of the secure application would be in non-compliance with an imposed licensing model; (4) uninstalling a secure application; (5) deleting data that is associated with a secure application; (6) encrypting data that the secure application writes to storage; (7) locking or deleting the secure application if a computing device on which the secure application is installed has been offline or disconnected from a network for more than a predetermined amount of time; (8) locking or deleting the secure application if an authentication associated with launching the secure application has been incorrectly presented more than a predetermined number of times; (9) enabling or disabling the ability of the secure application to write data to or retrieve data from external storage; (10) requiring reentry of an authentication if the secure application has been inactive after launch for greater than a predetermined amount of time; (11) forcing an authentication to be entered prior to operation of the secure application; (12) preventing operation of the secure application unless an authentication associated with the secure application meets predefined criteria; (13) preventing operation of the secure application if a privileges check determines that an unauthorized modification has been performed on a computing device on which the secure application is installed; (14) muting notifications from the secure application; (15) enabling the secure application to store data at an external location; (16) replacing an existing video source for the secure application with a new video source in which the new video source at least includes input from a display of a computing device; or (17) enabling the interaction of a new input/output device with the secure application in which the new input/output device at least includes a mouse.

Another method of generating a secure application is described herein. The method can include the steps of obtaining a target application and decomposing the target application into files that contain predictable instructions. The method can also include the step of identifying one or more predictable instructions in the files. The target application can be modified to create the secure application by binding one or more intercepts to the target application to enable the modification of the predictable instructions such that the behavior of the secure application is capable of being different from that of the target application. In addition, modifying the target application to create the secure application may maintain the pre-existing functionality of the target application, and changing the behavior of the secure application from the behavior of the target application can include selectively controlling the execution of the pre-existing functionality. As an example, selectively controlling the execution of the pre-existing functionality may refer to permitting the pre-existing functionality to occur or operate only if certain predetermined conditions are met. There are numerous examples of these predetermined conditions, like satisfaction of certain restrictions on a computing device on which the secure application is installed or if one or more directives placed on the operation of the secure application are followed.

A method of restricting access to an application is described herein. The method can include the step of obtaining a target application that is designed to conduct interprocess communications with a non-secure framework. Moreover, an obfuscated namespace for interprocess communications may be imposed on the target application during a securitization process to create a first secure application. The namespace can be integrated with a secure framework to permit the secure framework to process interprocess communications that are associated with the first secure application and that conform to the namespace. In contrast, the non-secure framework is unable to process the interprocess communications associated with the first secure application that conform to the namespace. The method can also include the step of permitting a second secure application that conducts interprocess communications that conform to the namespace to share data with the first secure application.

In one arrangement, the secure framework may be part of a secure partition that includes the first and second secure applications. The first secure application may register with the secure framework to identify which interprocess communications the first secure application may process from the secure framework. The non-secure framework may be part of a non-secure partition that includes non-secure applications, and the non-secure applications may not be permitted to retrieve data from the first or second secure applications. Imposing the namespace for interprocess communications may be based on existing constants associated with the non-secure framework, although such a condition may be merely an option.

A method of operating a secure application is described herein. The secure application may have been created from a target application having a first set of functions associated with a first application behavior. The secure application may have a second set of functions that are imposed on the first set of functions and that are associated with a second application behavior. The method can include the steps of receiving a request to activate the secure application and in response to the receipt of the request, forcing the secure application to override the first application behavior with the second application behavior. The second application behavior may take priority over the first application behavior. The method can also include the step of performing the second application behavior.

The method can also include the step of selectively permitting the secure application to engage in the first application behavior. For example, selectively permitting the secure application to engage in the first application behavior may include selectively permitting the secure application to engage in the first application behavior if predetermined criteria associated with the operation of the secure application are met. The predetermined criteria may be based on a policy. For example, if the secure application is permitted to operate outside a restricted time period and the current time is outside this restricted period, the secure application may operate in accordance with the first application behavior. Of course, there are numerous other examples that may apply here. In one arrangement, the secure application may be encapsulated to prevent data sharing with a non-secure application.

A system for generating a secure application is described herein. In this system, all the examples and descriptions presented with respect to the above methods may apply to this system and the others that will be presented below. The system here can include a disassembler that is configured to receive and decompose a target application into original files that contain predictable instructions. The system can also include a securitization agent that is configured to identify one or more predictable instructions in the original files of the target application. The securitization agent may also modify the target application to create the secure application by binding one or more intercepts to the target application such that the behavior of the secure application is capable of being different from that of the target application. The securitization agent may modify the target application without access to the source code of the target application.

As an example, the bound intercepts may be integrated with the original files, even as an immutable entity obfuscated to prevent further disassembly. In other words, the references (some or all of them) may be statically resolved for a secure application such that they are considered to be integrated with the existing components of the secure application. In another arrangement, the securitization agent may be further configured to preserve operating system interactions that were originally defined for the target application and an operating system for which the target application was designed. In yet another arrangement, the securitization agent may be further configured to impose a secure and unpredictable namespace on the interprocess communications of the target application to prevent unauthorized access to the interprocess communications of the secure application. For example, the unauthorized access may include a non-secure application attempting to retrieve data associated with the secure application. As another example, the namespace may permit secure applications to share data among each other.

In one embodiment, the securitization agent may be a mapping engine, and the predictable instructions may be byte codes. In this case, the mapping engine may be configured to programmatically inject secure byte codes in the place of pre-existing byte codes in which the secure byte codes may override the pre-existing byte codes. A behavior of the target application associated with the pre-existing byte codes may still be performed if a policy that is associated with the secure byte codes is satisfied.

In another embodiment, the securitization agent may be a linker, and the predictable instructions may be references. Here, the linker may be configured to programmatically inject secure references in the place of pre-existing references such that the secure references take priority over the pre-existing references. In addition, the linker may be further configured to reset a linking order to enable the secure references to have the priority over the pre-existing references. A behavior of the target application associated with the pre-existing references may still be performed if a policy that is associated with the secure references that override the pre-existing references is satisfied.

In one arrangement, the behavior of the secure application that is different from that of the target application may be based on a policy. As an example, the policy may be static or dynamic, and a dynamic policy may be modified following the creation of the secure application. As another example, a first policy associated with a secure application may exist for a first group of computing devices, and a second policy associated with the secure application may exist for a second group of computing devices. As such, different policies may exist for the same secure application. The behavior of the secure application that is different from that of the target applications includes examples that are similar to those presented above with respect to the methods previously described. For brevity, they will not be presented here. In another arrangement, the securitization agent may be further configured to modify multiple target applications to create multiple corresponding secure applications and the multiple secure applications are related to one another.

Another system for creating a secure application is described herein. The method can include a disassembler that may be configured to receive a target application and make available predictable instructions of the target application. The system can also include a securitization agent that may be configured to identify at least some of the predictable instructions and configure the target application with respect to the identified predictable instructions to enable selective behavior modification of the target application, thereby creating the secure application. The securitization agent may also be able to configure the target application without access to the source code of the target application and to preserve the normal functions and application programming interfaces of an operating system for which the target application was designed.

The securitization agent is capable of configuring the target application by imposing one or more intercepts on the identified predictable instructions of the target application. For example, the predictable instructions may be non-secure byte codes, and the securitization agent may be configured to programmatically inject secure byte codes in the place of the non-secure byte codes. As another example, the predictable instructions may be non-secure references, and the securitization agent may be further configured to programmatically inject secure references in the place of the non-secure references. In another arrangement, the securitization agent is further able to configure the target application by encapsulating the secure application to restrict access to interprocess communications associated with the secure application. As an example, the disassemble may receive the target application from a non-secure application repository, and the secure application may be sent to a secure application repository.

Another system for creating a secure application is described herein. This system may include a disassembler that may be configured to receive a target application and decompose the target application into files that contain predictable instructions of the target application. The system may also include a securitization agent that may be configured to identify at least some of the predictable instructions and modify the target application to create the secure application by binding one or more intercepts to the target application. The intercepts can enable the modification of the predictable instructions such that the behavior of the secure application is capable of being different from the original behavior of the target application. The securitization agent may be further configured to maintain pre-existing functionality of the target application and change the behavior of the secure application from the original behavior of the target application by enabling selective control of the execution of the pre-existing functionality.

A system for restricting access to an application is also described herein. The system can include a disassembler that is configured to obtain a target application that is designed to conduct interprocess communications with a non-secure framework. The system may also include a securitization agent that can be configured to impose a namespace for interprocess communications on the target application during a securitization process to create a first secure application. In this case, the namespace is to be integrated with a secure framework to permit the secure framework to process interprocess communications that are associated with the first secure application and that conform to the namespace. The non-secure framework, conversely, will be unable to process the interprocess communications associated with the first secure application that conform to the namespace. A second secure application that conducts interprocess communications that conform to the namespace may be permitted to share data with the first secure application.

In one embodiment, the secure framework can be part of a secure partition that will include the first and second secure applications. The non-secure framework may be part of a non-secure partition that may include non-secure applications, and the non-secure applications will not be permitted to retrieve data from the first or second secure applications.

A computing device is described herein. The computing device can include an input device that may be configured to receive a request to activate a secure application that is installed on the computing device. The secure application was created from a target application having a first set of functions associated with a first application behavior. The secure application can have a second set of functions that may be imposed on the first set of functions and that may be associated with a second application behavior. The computing device may also include a processing unit that may be configured to receive a request to activate the secure application and to force the secure application to override the first application behavior with the second application behavior. The second application behavior may take priority over the first application behavior. The processing unit may be further configured to execute the secure application to cause the secure application to perform the second application behavior.

The processing unit can be further configured to selectively permit the secure application to engage in the first application behavior. For example, the processing unit can be configured to selectively permit the secure application to engage in the first application behavior by selectively permitting the secure application to engage in the first application behavior if predetermined criteria associated with the operation of the secure application are met. As an example, the predetermined criteria may be based on a policy. In addition, the secure application may be encapsulated to prevent data sharing with a non-secure application.

Further features and advantage, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Figure 1:
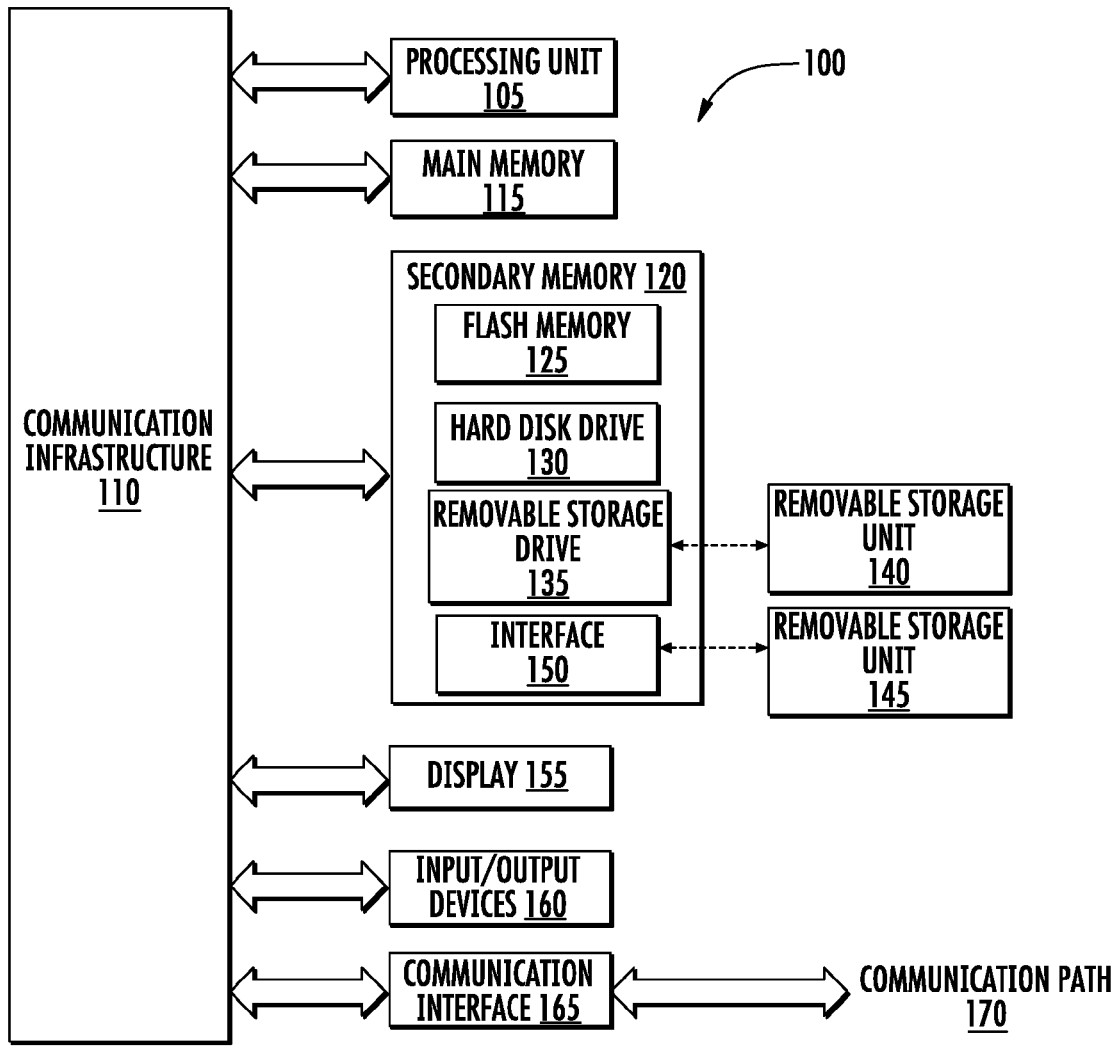
FIG. 1 illustrates an example of a computing device.

Applicants expressly disclaim any rights to any third-party trademarks or copyrighted images included in the figures. Such marks and images have been included for illustrative purposes only and constitute the sole property of their respective owners.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged between the components on a unidirectional or bidirectional (or multidirectional) manner, either wirelessly, through a wired connection or a combination of both. A "computing device" is defined as a component that is configured to perform some process or function for a user and includes both mobile and non-mobile devices. An "application" is defined as a program or programs that performs one or more particular tasks on a computing device and includes programs that may present a user interface for interaction with a user or that may run in the background of an operating environment that may not present a user interface while in the background. The term "operating system" is defined as a collection of software components that directs a computing device's operations, including controlling and scheduling the execution of other programs and managing storage, input/output and communication resources. A "processing unit" is defined as one or more components that execute sets of instructions. The term "memory" or "memory unit" is defined as one or more components that are configured to store data, either on a temporary or persistent basis.

As explained earlier, many entities have hesitated to place sensitive data on mobile devices carried by their employees or associates. A comprehensive solution is presented here that accommodates the security requirements of companies or organizations and the desire by employees or other persons affiliated with such entities to use their own personal devices to access confidential material. This solution provides strong segmentation and encapsulation of enterprise applications and data and is well-suited for both company-owned and personally-owned devices (those devices owned by employees or associates).

Earlier presentations have been provided that describe a cross-platform mobile device management (MDM) solution, such as in U.S. patent application Ser. No. 13/179,513, filed on Jul. 9, 2011, which is incorporated by reference herein in its entirety. This MDM solution allows IT administrators to, for example, provision devices, manage inventory, control network access, require minimum security settings, set policies and protect corporate data. In addition, this filing discloses an electronic storefront that permits an enterprise to manage and distribute content developed by the enterprise or by another party. The storefront may be accessed by and distribute applications to a wide variety of devices supported by numerous operating systems and may be referred to as an application repository. An "application repository" is defined as a medium that offers one or more applications for download to a computing device. A "secure application repository" is defined as a medium that offers one or more secure applications for download to a computing device and may or may not require authentication to access and/or download the secure application. As part of this distribution, organizations may be provided with numerous application licensing models from which to choose, giving them greater flexibility in deploying applications and other content.

The description here builds on these solutions by offering enterprises the ability to create a virtual enterprise workspace on any number of mobile devices. In particular, distinct profiles or spaces can be created for a mobile device in which one or more personal profiles or partitions can be assigned for a user's personal data, while one or more secure profiles or partitions can be set aside for sensitive data. In addition, a secure profile can be configured to keep the data in the secure profile from being accessed by applications—including potentially harmful malware—associated with a personal profile. To ensure such protection, data that is to be part of a secure profile can be modified to limit or restrict interaction with applications or programs that are not part of the secure profile. Moreover, the enterprise can have full control over the enterprise workspace and the content assigned therein; however, the user of the computing device may maintain control of his or her device without affecting the security of enterprise information. The term "secure profile" or "secure partition" may be defined as a workspace that is configured to contain secure content, such as secure applications, programs, processes and confidential data, associated with one or more entities and to protect such secure content by restricting access to it from unauthorized applications, programs, services or processes. A "personal profile" or "personal partition" is defined as a workspace that is configured to contain the personal content associated with a user of a computing device.

Another part of this description concerns the concept of managing applications, such as those applications that may be designated for a secure partition or otherwise require to be controlled in some way. The applications that are to be managed may be wrapped with a security or management layer and may inter-operate with a secure partition. This procedure converts the application into a managed application. There are no constraints as to the type of application that may be managed or otherwise controlled, and they may be installed and removed from a user's computing device without interfering with the user's personal applications and data, such as pictures and music. These managed applications, also referred to as secure applications, may be subject to execution policies specified by the enterprise. These policies may relate to application licensing, geographical or temporal restrictions, the user's position within the enterprise or other such criteria. Additionally, the enterprise may enforce certain rules for password protection of applications without relying on the protection mechanisms that a computing device owner chooses for the system as a whole. In another arrangement, the enterprise may dictate that enterprise data is to be encrypted and that communication and data sharing between personal applications—sometimes referred to as non-secure applications—and secure applications are to be restricted. This process can prevent non-secure applications from maliciously interacting with enterprise applications or data.

An example of how to convert an application into a managed application is to automatically inject new functionality into pre-compiled applications, a method sometimes referred to as application wrapping or application securitization. Application wrapping can be an automated process that augments an application with new capabilities. No source code needs to be modified, which removes the risk of programmer oversight and errors. In one arrangement, the wrapping process may replace references to system services with references to implementations provided by a library that applies the needed mechanisms and policies. In another arrangement, secure references may be inserted into the code of an application to replace non-secure references in the application. Moreover, the wrapping of applications can invoke additional logic prior to and at the end of executing an application and can add monitoring and instrumentation capabilities to that application.

Thus, application wrapping can provide enhanced application management, including application security. In one arrangement, a conventional application may be uploaded to one or more relevant servers and wrapped with minimal or no effort on the part of the developer of the application. There are no special application programming interfaces (API) that developers need to learn and accommodate in their programming, and the standard set of system APIs for each platform remains available to the developers. As a result, application wrapping may enable the injection of management layers onto the compiled applications, with no need for source code or developer-implemented application changes.

The concepts presented here may be applicable to any suitable machine, including mobile devices and desktop computers. Referring to FIG. 1, an example of a computing device 100 that may be used to implement such concepts is shown. The computing device 100 can include a processing unit 105 that may include one or more processors or processor cores. Processing unit 105 may be connected to a communication infrastructure 110, which may comprise, for example, a bus or a network.

The computing device 100 may also include a main memory 115, which may be random access memory (RAM), such as a flash-based memory, and may also include a secondary memory 120. Secondary memory 120 may comprise any of the following components: flash memory 125, a hard disk drive 130 and/or a removable storage drive 135. Removable storage drive 135 may read from and/or write to a removable storage unit 140 in a well-known manner. Removable storage unit 140 may comprise any suitable form of memory that can be read by and written to by removable storage drive 135. As will be appreciated by persons skilled in the relevant art(s), removable storage unit 140 may include a computer-readable storage medium having stored therein computer software and/or data.

In alternative implementations, secondary memory 120 may include other similar components for allowing computer programs or other instructions to be loaded into the computing device 100. Such components may include, for example, a removable storage unit 145 and an interface 150. Examples of these devices may include a memory stick and an industry standard interface (such as a universal serial bus (USB) interface) suitable for interfacing with the memory stick, a memory card and associated card reader, a removable memory chip (such as an EPROM or PROM) and associated socket, a program cartridge and cartridge interface (such as that found in video game devices), and other removable storage units and interfaces that allow software and data to be transferred from removable storage unit 145 to the computing device 100. Although several examples are presented here, it is understood that the computing device 100 may incorporate other forms of memory, both for temporary and persistent storage solutions.

The computing device 100 may further include a display 155 for presenting user-viewable content rendered by processing unit 105 and/or optional display interface hardware as well as one or more input/output (I/O) devices 160 for receiving input from or producing output to a user. Exemplary input devices include a keyboard, mouse, keypad, touch screen, or the like. Exemplary output devices include audio devices such as speakers. Display 155 may also be considered an output device.

The computing device 100 may also include one or more communication interfaces 165. The communication interface 165 may allow software and data to be transferred between the computing device 100 and external devices and/or networks. Examples of the communication interface 165 may include a modem, a network interface (such as an Ethernet card), a communications port, a PCMCIA slot and card, a wired or wireless communication stack, or the like. Software and data transferred via communication interface 165 are in the form of signals, which may be electronic, electromagnetic, optical, or other signals capable of being received by communication interface 165. These signals are provided to communication interface 165 via a communication path 170. Communication path 170 carries signals and may be implemented using wired communication media such as a phone line, coaxial cable or fiber optic cable, as well as wireless communication media such as radio frequency (RF) or infrared communication channels.

As used herein, the terms "computer program medium" and "computer readable medium" are defined as one or more components that are configured to store instructions that are to be executed by a processing unit. These terms are used to generally refer to media, such as the removable storage unit 140, the removable storage unit 145, flash memory 125 or a hard disk installed in hard disk drive 130. Computer program medium and computer readable medium can also refer to memories, such as main memory 115 and secondary memory 120, which can be semiconductor devices (e.g., DRAMs, etc.). These computer program products are means for providing software to the computing device 100.

Computer programs (also called computer control logic, programming logic, or logic) may be stored in main memory 115 and/or secondary memory 120. Computer programs may also be received via communication interface 165. Such computer programs, when executed, enable the computing device 100 to implement the features described herein. Accordingly, such computer programs may represent controllers of the computing device 100. Where any features described herein are implemented using software, the software may be stored in a computer program product and loaded into the computing device 100 using the removable storage drive 135, interface 150 or communication interface 165.

In one embodiment, the computing device 100 may be owned by, for example, an employee of an enterprise, and the employee may wish to access from the employee's personal computing device 100 certain applications and data that are related to the enterprise. To realize this access and to enable management of this computing device 100, the employee can install on the device 100 an application or client offered by the enterprise or some other entity. This application can be obtained from any suitable application repository or other platform, such as through an e-mail or some other message received at the device 100 or some other suitable component. In another embodiment, the computing device 100 may be provided to the employee by the enterprise, and the device 100 may already have the client installed on the device 100.

In either arrangement, as part of the installation, the personal content of the computing device 100 can be largely unaltered, including the number and type of applications installed and available for installation and Wi-Fi and cellular communications. That is, when operating in the user's personal profile or partition, the user may notice little difference in the overall operation of the computing device 100. Notably, however, a separate virtual partition can be generated as part of the installation, and the separate partition can be used to provide access to sensitive data. Specifically, this configuration can provide the capability to encapsulate and secure applications and data on the computing device 100 to prevent malicious applications or malware from, for example, intercepting data during runtime. As will be explained later, this arrangement can ensure, for example, that persisted data can be encrypted for storage on the portable computing device 100 or some other component or system. Thus, the separate partition can be referred to as a secure partition. Additionally, applications that have been modified for implementation into a secure partition can be referred to as secure applications. The personal partition may be referred to as a non-secure partition, although it is not limited to only including applications or data associated with the user of the device 100.

The computing device 100 with the secure partition can also establish communications with a managed services platform. As such, data and control signals can be exchanged between the managed services platform and the computing device 100. This feature can also permit an entity to manage a computing device 100 that belongs to the user or has been provided to the user. The device 100 may also receive push notifications from any suitable service as part of a communications process. For example, the push service may establish a secure and persistent connection with the computing device 100, and the push service may receive notifications from one or more developers or providers associated with content that is on the device 100. The push service may then push the notification to the computing device 100, and the notification is routed to the appropriate content on the device 100.

Figure 2:
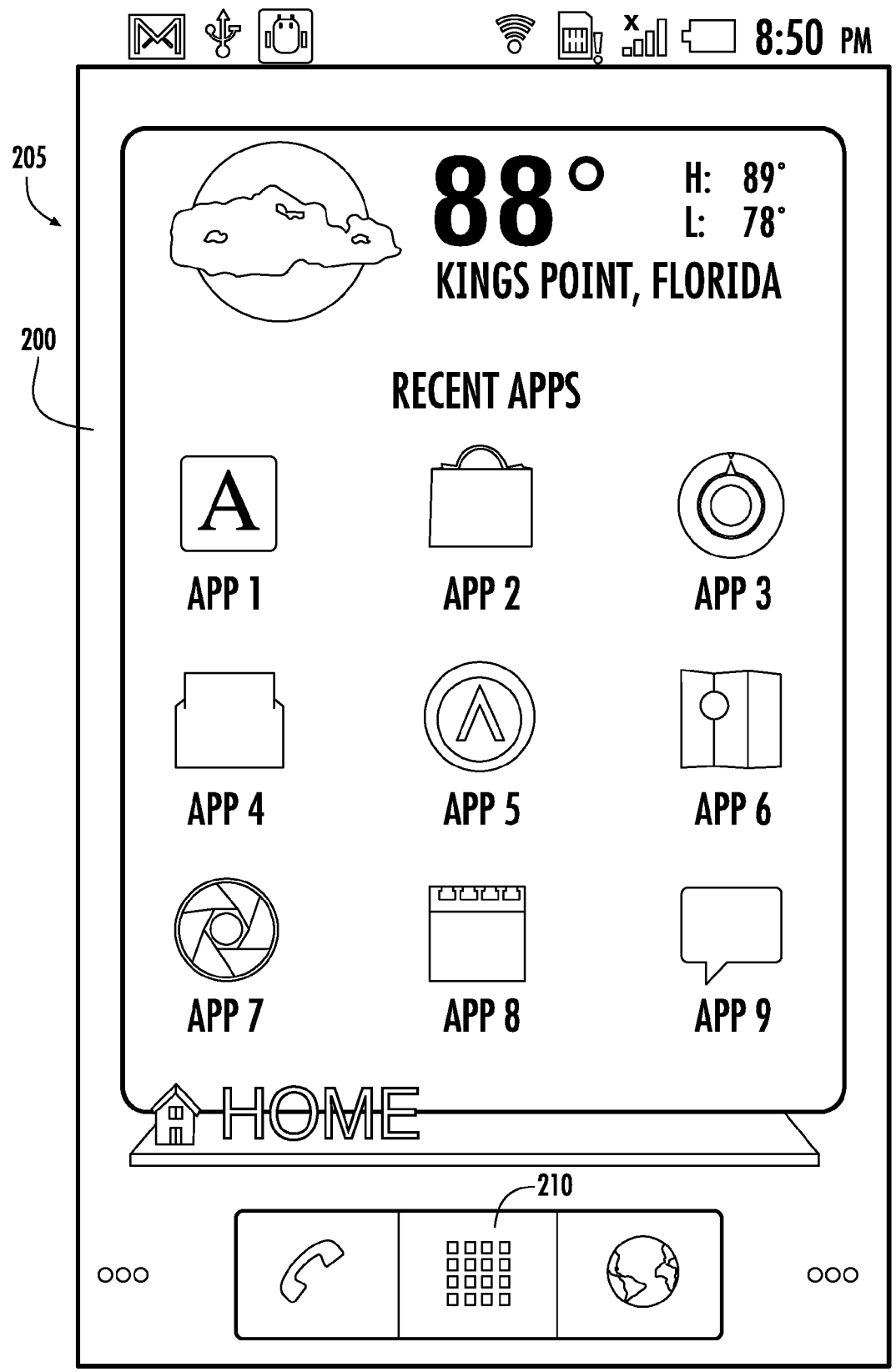
FIG. 2 illustrates an example of a home page for a non-secure partition.
Figure 3:
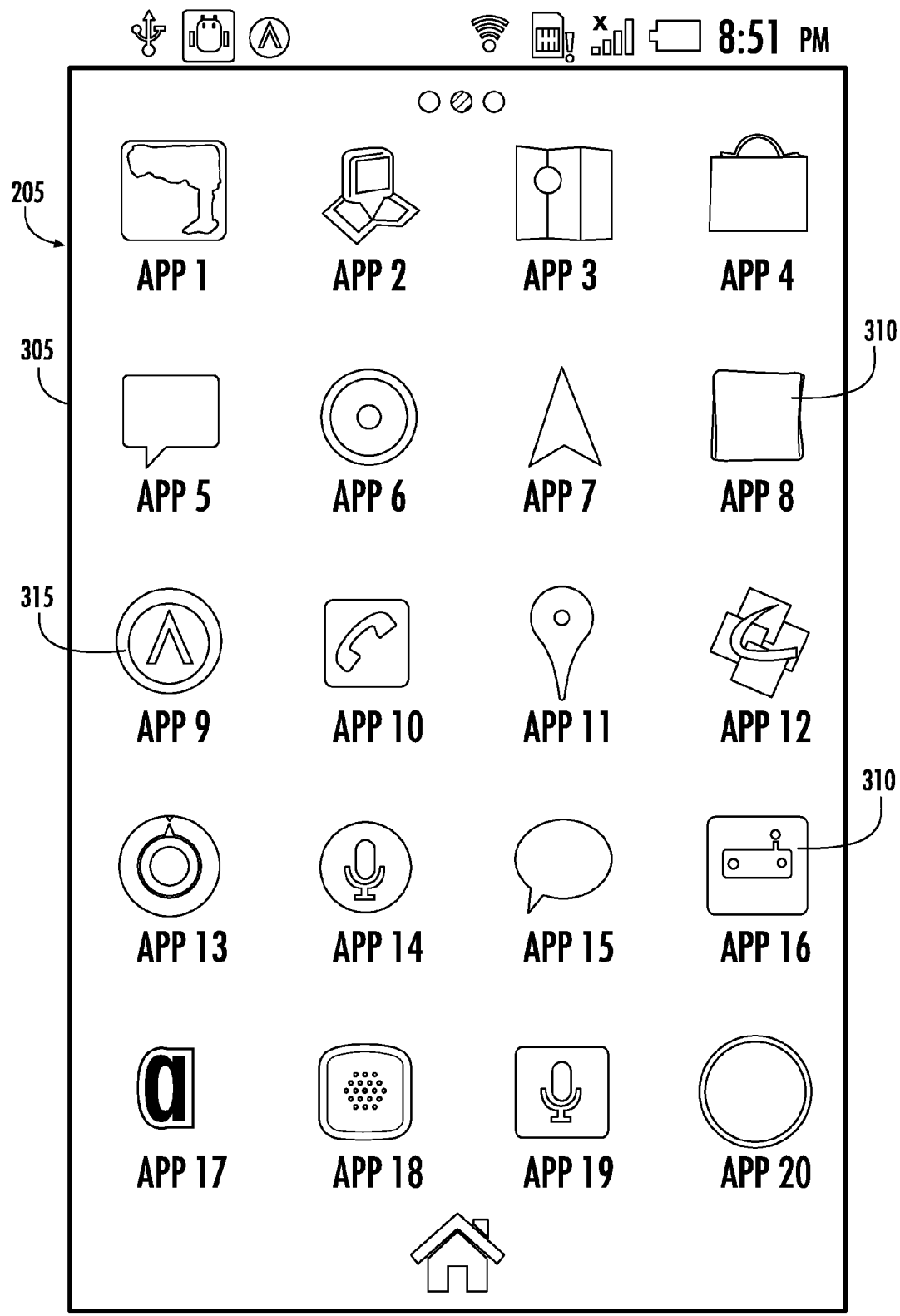
FIG. 3 illustrates an example of an application page for a non-secure partition.

Examples of a computing device 100 that has been configured to support both personal and secure partitions will be presented. Referring to FIG. 2, an example of a home page 200 is shown. The home page 200 can be part of a personal partition 205 that can be associated with the computing device 100. As an example, selection of an applications button 210 on the home page 200 can cause an applications page 305 to be displayed on the device 100, an example of which is shown in FIG. 3. The applications page 305 can display various applications 310, which can be part of the personal partition 205. As noted earlier, this partition 205 and, hence, these applications 310 are part of a non-secure environment.

In one arrangement, the user of the computing device 100 may visit an appropriate application repository, such as an electronic application store, and the user can install an application or client on the device 100 that can facilitate the generation of a secure profile or partition for the device 100. As part of this installation, the application can authorize the computing device 100 through any number of established processes and can direct the installation of one or more other applications, such as through the delivery of a bundle to the device 100. The bundle may include any suitable type of content, including default applications and settings. A management application (not shown) may also be installed, which may be part of a secure workspace or partition and can facilitate individual application management. The management application may register with the system to let the system know which communications it wants to receive, which can ensure compliance with any particular namespace enforcement scheme. This initial installation may also be executed by the delivery of a message to the computing device 100, such as through an e-mail, text or instant message with appropriate links, or through some other suitable technique.

Figure 4:
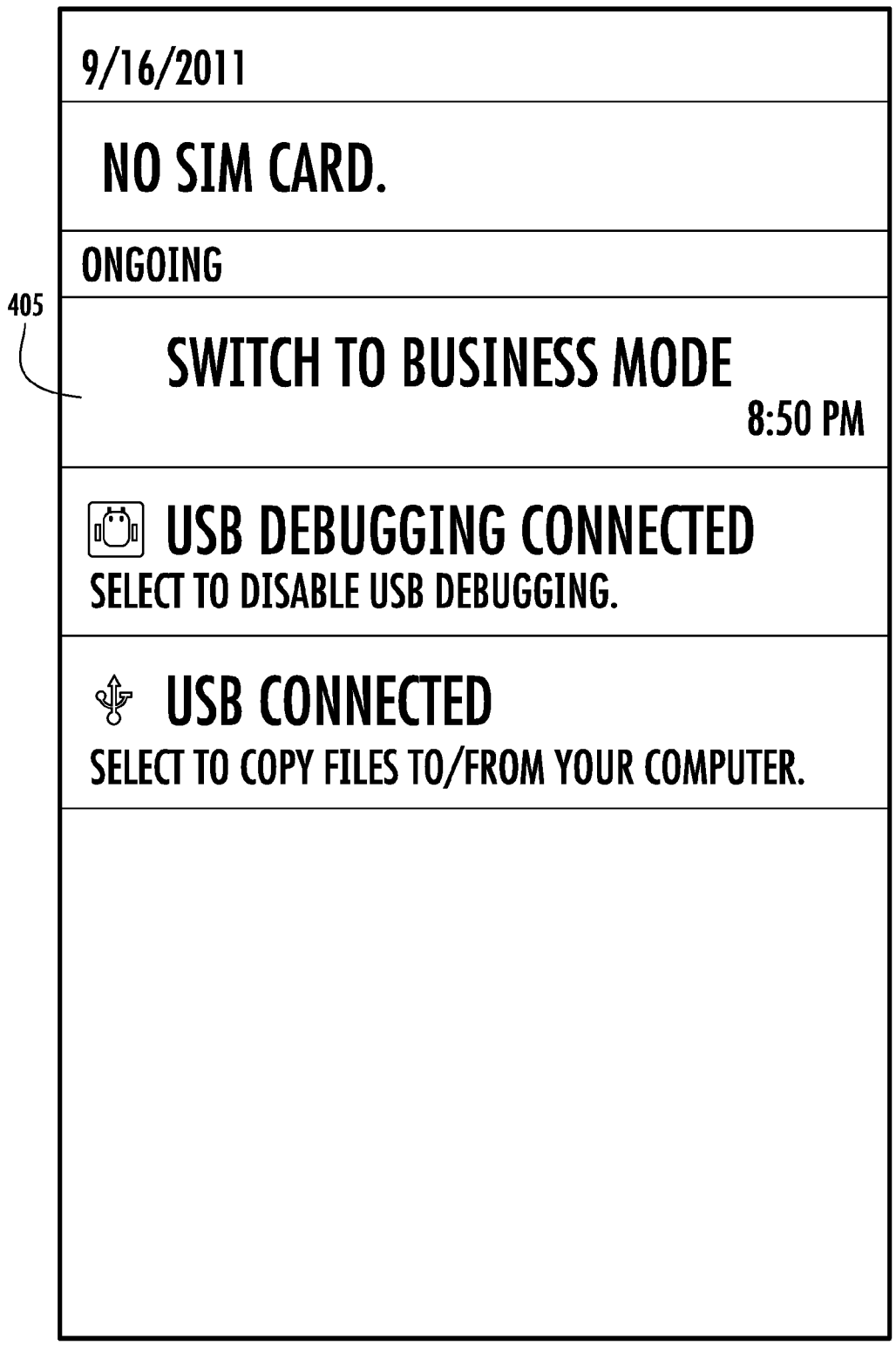
FIG. 4 illustrates an example of a secure partition option.
Figure 5:
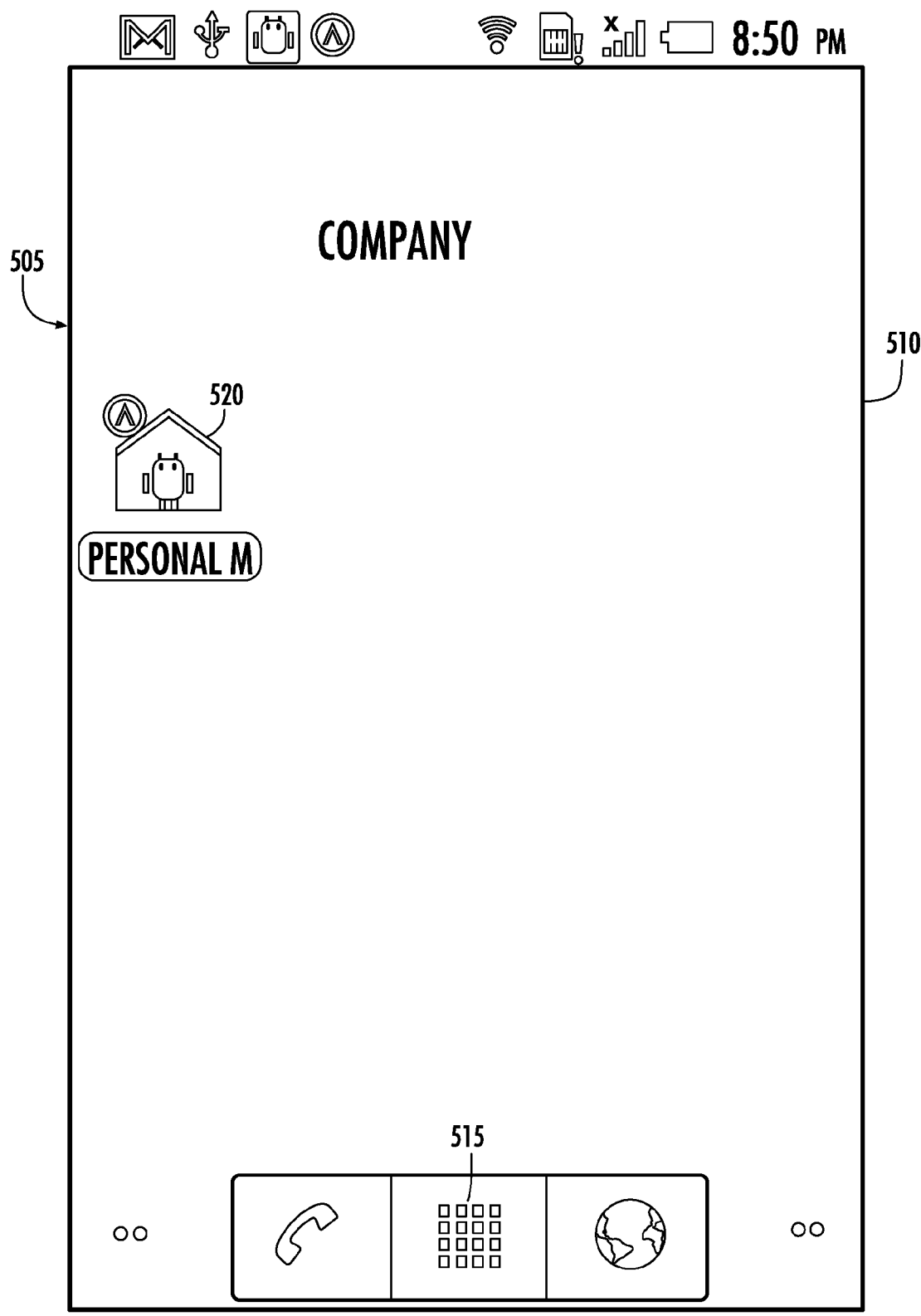
FIG. 5 illustrates an example of a home page for a secure partition.

In view of the installation of an appropriate application on the computing device 100, a secure partition can be generated for the device 100. In one arrangement, the secure partition can be a virtual partition that can be graphically represented on the device 100. Applications and data that are encapsulated within the secure partition can be protected from the non-secure applications 310 of the personal partition 205. As an example, to access a secure partition, a user can select a secure partition icon 315, an example of which is shown on the applications page 305 of FIG. 3. This secure partition icon 315 can be generated during the creation and initialization of the secure partition. In response to the selection of the secure partition icon 315, a secure partition option 405 can be presented to the user, an example of which is shown in FIG. 4. If the user selects the secure partition option 405, then a secure partition 505 can be presented to the user, an example of which is shown in FIG. 5. Here, an example of a home page 510 of the secure partition 505 is shown. In this environment, the applications and data that are part of the secure partition 505 can be protected from unauthorized access from other applications, such as the applications 310 of the personal partition 205 or even from applications that are part of the secure partition 505.

Because an enterprise may be providing a user access to sensitive data, measures can be taken to ensure that such information is protected, particularly from the applications 310 that are part of the user's personal partition 205. In one arrangement, encapsulation of the internal communication of applications designated for inclusion in the secure partition 505 can be accomplished by creating a namespace for inter-process communications, inter-module communications and system event broadcasts. As an example, the namespace construct can be a form of an abstract container created to hold a logical grouping of names. As an identifier may be unique within a given namespace, the meaning associated with that identifier may be unique to that namespace and, as such, may serve to encapsulate similar identifiers that may reside in the context of a different namespace.

Imposition of derived and unpredictable namespaces for applications included in the secure partition 505 can provide secure process communication within the secure partition 505. For additional protection, communication payloads associated with the secure partition 505 may be encrypted. This arrangement can prevent applications that are not part of the secure partition 505 from gaining access to communications and associated data within the secure partition 505. For example, namespace encapsulation can ensure that even if co-located non-secure (i.e., in the personal partition 205) versions of the same application exist, the secure version is only serviced by the secure partition 505, a secure application in the secure partition or some other authorized service. Namespace enforcement may extend to applications that are part of the secure partition 505, as well. Even so, as will be explained later, applications in the secure partition 505 may be configured to exchange communications with one another in accordance with the namespacing that is employed in that partition 505. Processes for carrying out the encryption and decryption of data associated with the secure partition 505, along with other management techniques, will be presented below.

Referring once again to FIG. 5, as an option, the home page 510 can include any suitable number and type of indicators that the home page 510 is part of the secure partition 505 and is part of a protected environment. For example, the home page 510 can include text that informs the user of the restricted environment of the secure partition 505. Other stimuli can be used to convey such information, like predetermined colors displayed on the screen of the computing device 100 or predetermined audio or vibratory signals from the device 100. These indicators may also be experienced in other pages of the secure partition 505 (i.e., not just the home page 510).

As another option, when accessing the secure partition 505, a user may be required to provide authentication information. For example, when the secure partition icon 315 (see FIG. 3) or the secure partition option 405 (see FIG. 4) is selected, the user may need to provide the necessary credentials to access the secure partition 505. As an example, the necessary credentials may be a password. As another example, the computing device 100 or some other unit in communications with the device 100 may be equipped with one or more biometric measuring devices (not shown), like an optics scanner, a fingerprint scanner, a voice analysis module or virtually any other component that can help determine a person's identity through a biometric measurement or sample. The user can provide a biometric sample to such a device and can be authenticated to permit access to the secure partition 505.

Figure 6:
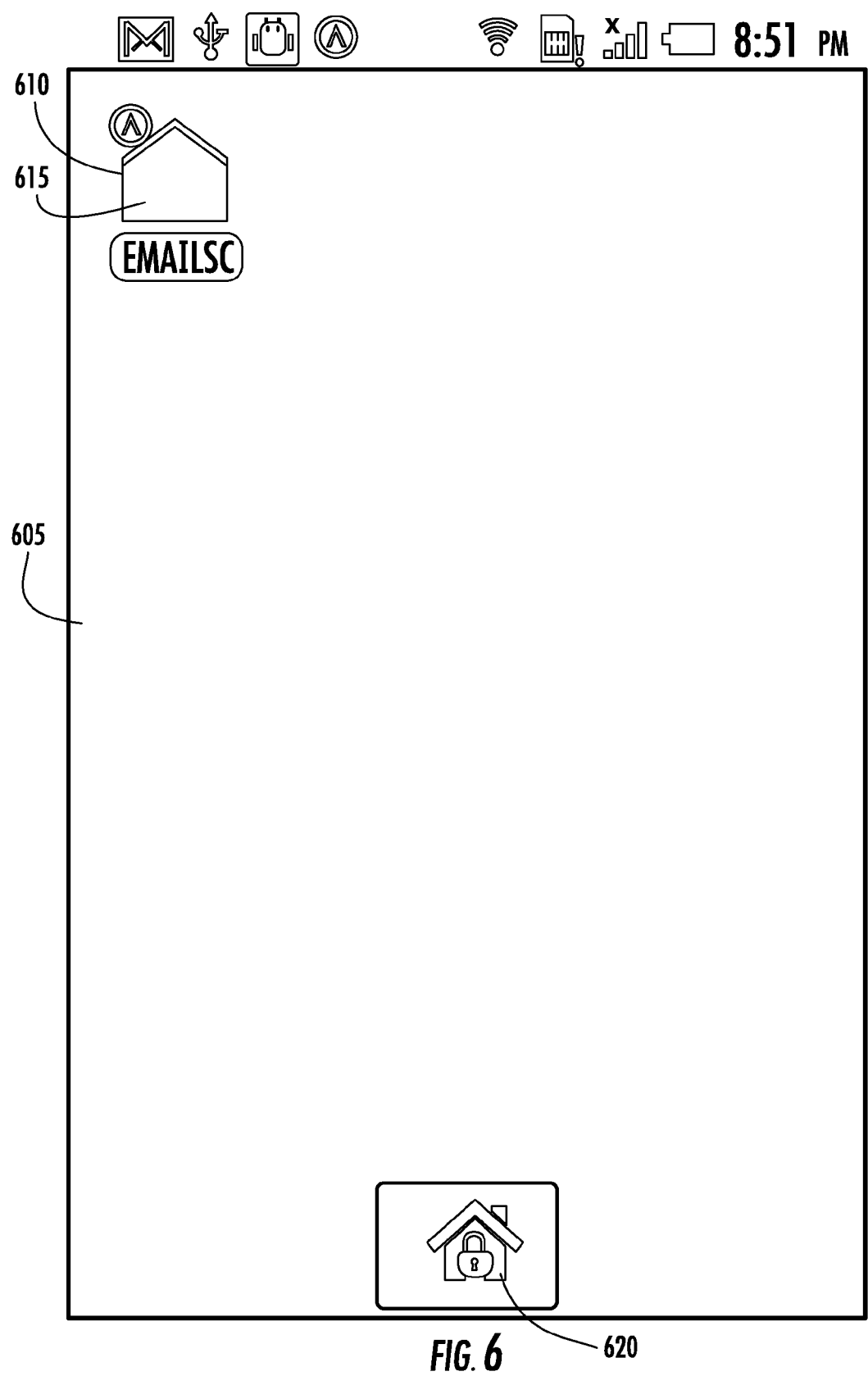
FIG. 6 illustrates an example of an application page for a secure partition.

In the secure partition 505, the user can have access to sensitive applications, data and other content, such as that provided by the user's employer or some other organization associated with the user. For example, the user can activate an applications button 515 on the home page 510 of the secure partition 505, and a secure applications page 605 can be presented on the computing device 100, an example of which is shown in FIG. 6. Here, one or more secure applications 610 can be made available to the user. For example, a secure e-mail application 615 can be launched by the user, and the user can retrieve and compose messages in a fashion similar to that experienced by the user operating a laptop or desktop computer in a corporate office or other location. Notably, the secure e-mail application 615 is protected from unauthorized access by other unauthorized applications or programs, and data associated with the secure e-mail application 615 may be selectively encrypted and decrypted. In one arrangement, a secure application 610 may only be launched in the secure partition 505.

Although the secure partition 505 has been explained as being suitable to protect corporate data, it is understood that the description here is not so limited. That is, the secure partition 505 can be used to protect data and applications associated with any suitable entity and may be used to secure personal information that is not associated with a user's employer. Moreover, some of the secure applications 610 may be default applications that can be included as part of the initial installation and generation of the secure partition 505 or delivered some time following the creation of the secure partition 505. Also, a user may be required to be authenticated prior to using/launching a particular secure application 610, which may be in addition to or in lieu of the authentication required to access the secure partition 505.

Figure 7:
FIG. 7 illustrates an example of a non-secure partition option.
Figure 7:
Figure 7:

Once in the secure partition 505, the user may wish to return to the personal partition 205. To do so, a user may activate a home page icon 620 on the secure applications page 605, an example of which is shown in FIG. 6, and then can activate a personal partition icon 520, an example of which is shown in FIG. 5. In response, a personal partition option 705 can be presented to the user, an example of which is shown in FIG. 7. If the user selects the personal partition option 705, then the personal partition 205 can be presented to the user again (see FIG. 2). As an option, the user may be required to provide authentication information, such as a password or a biometric sample, to gain access to the personal partition 205 (or to leave the secure partition 505). If such an option is implemented, the authentication information necessary to access the personal partition 205 may or may not be the same as that needed for the secure partition 505. During the transition from the secure partition 505 to the personal partition 205 or when operating in the personal partition 205, the user can be made aware that the user is no longer operating in a secure environment, such as through the display of text or colors, the broadcasting of audio or the generation of haptics signals.

If the user moves from the secure partition 505 back to the personal partition 205, simply logs out of the secure partition 505 or the computing device 100 is shut down or enters a sleep state, several processes may take place. In one arrangement, the secure applications 610 that were previously opened can be automatically closed and persistent data can be encrypted and move to storage, whether local or remote. This automatic shut-down of the secure applications 610 can occur without any input from the user. Of course, persistent data associated with those secure applications 610 that the user does close on his/her own volition before leaving the secure partition 505 can be encrypted.

In another arrangement, at least some of the secure applications 610 that were opened previously can be kept open when the user leaves the secure partition 505. In particular, there may be some secure applications 610 that process or facilitate events that may require the user's attention. For example, it may be desirable to maintain the secure e-mail application 615 in an open state to permit the application 615 to receive (or transmit) messages or to process calendar events or other reminders. The type of secure applications 610 that can be maintained in an open state once the user leaves the secure partition 505 can be determined by an entity that is managing the computing device 100, such as the user's employer, or even by the user. In this scenario, encryption of the persistent data for those secure applications 610 that are closed and—to the extent possible—for those secure applications 610 that are to remain open can be carried out when the user leaves the secure partition 505. In one arrangement, if a user attempts to close an open secure application 610, the secure application 610 can be made to run in the background if it is determined that the secure application 610 should remain open to process or facilitate events. As an example, this feature can ensure that certain secure applications 610, such as the secure e-mail application 615, can continue operations to ensure that a user's access to communications with respect to this particular platform remains available. As also noted earlier, a scheme can be implemented in which a push service can be used to provide non-secure applications 310 or secure applications 610 with any suitable type of notification.

Figure 8:
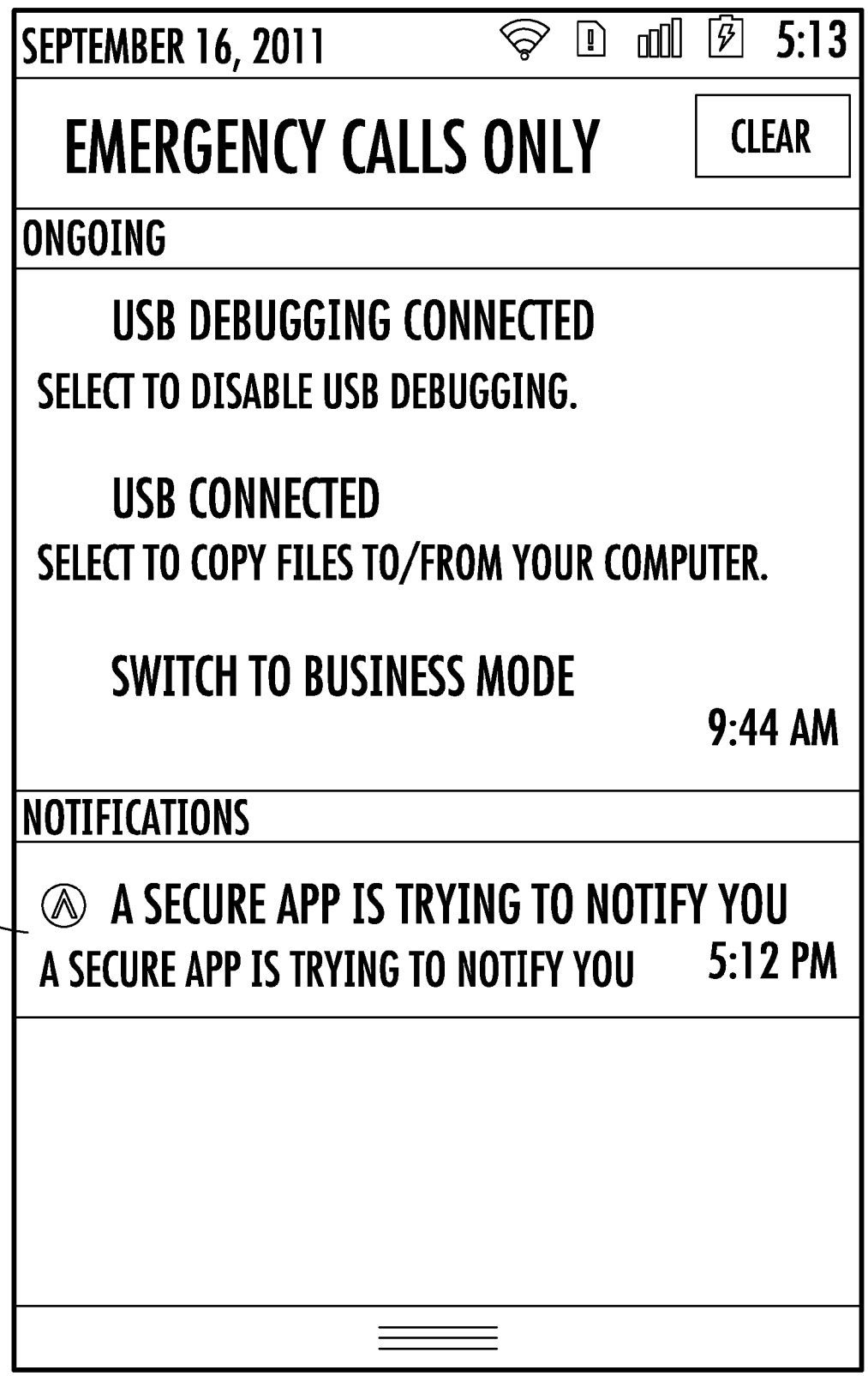
FIG. 8 illustrates an example of a notification.

Because a user may switch from the secure partition 505 to the personal partition 205, it may be desirable to inform the user of events that transpire in the secure partition 505 while the user is operating in the personal partition 205. For example, the secure e-mail application 615 of the secure partition 505 may receive a message, and the user may wish to be notified of such an event. As such, the secure e-mail application 615 may generate a notification signal, which can cause a notification to appear in the personal partition 205. An example of a notification 805 that can appear in the personal partition 205 is shown in FIG. 8. Once the user is aware of the notification 805, the user can access the secure partition 505 (as previously described) to retrieve the message. Such a notification may also be provided while the user is operating in the secure partition 505.

Because the notification 805 may be generated from a signal that crosses the barrier between the secure partition 505 and the personal partition 205, steps can be taken to ensure that the notification 805 is limited in the amount of information that it discloses. For example, events associated with such a notification 805 may be intercepted to permit the notification 805 to be muted prior to being forwarded to the non-secure framework for display or broadcast. For example, the notification 805 may simply inform the user that a secure application 610 is attempting to contact the user, as shown in FIG. 8. Such a feature may be possible in view of the encapsulation process previously described, as the notifications may be adjusted according to the configurations of the secure partition 505.

The muting of the notification 805 from the secure partition 505 can be adjusted to permit additional (or even less) information to be provided to the user in the personal partition 205. In fact, the level of muting can reach a level where no notifications 805 are received from the secure partition 505 or secure applications 610. In addition, it must be noted that the notifications 805 are not necessarily limited to the receipt of a message in the secure partition 505, as other events may trigger them, such as when an application is not available or has been modified in some way. The notifications associated with these various trigger events can also be muted, as described above.

Muting of notifications may or may not be conducted while the user is operating in the secure partition 505. For example, if the user is using a secure application 610 in the secure partition 505 that is authorized to receive full notifications, then it may not be necessary to mute the notification. If, however, the secure application 610 is not so authorized, then a muted notification may be generated while that secure application 610 is active.

As an option, when the user accesses the secure partition 505 or an authorized secure application 610, the full contents of the notification 805—or at least additional details in comparison to the muted notification 805 in the personal partition 205—can be provided to the user. This feature can help the user to determine whether to launch the relevant secure application 610. In another arrangement, notifications from events associated with the personal partition 205 that are announced while the user is operating in the secure partition 505 may contain full content, as it may not be necessary to mute them.

It must be noted that the computing device 100 can be configured to support multiple personal partitions 205 and multiple secure partitions 505. For example, a user may be assigned multiple secure partitions 505 to support different entities in which each supported entity can be associated with a secure partition 505. As a more specific example, the user may have several clients, and the device 100 can support a secure partition 505 for each client. In this arrangement, the secure applications 610 in a first secure partition 505 can be isolated from the applications 310 in a personal partition 205 and the secure applications 610 in other secure partitions 505. Moreover, the computing device 100 can be configured to support multiple users, each with their own one or more personal partitions 205 and one or more secure partitions 505, with full encapsulation where necessary.

Thus far, the description herein has primarily focused on the creation of distinct multiple partitions on a computing device 100, such as a personal partition 205 and a secure partition 505. As explained above, if a user wishes to access, for example, the secure partition 505, the user may be required to provide some authenticating information (e.g., password or biometric sample). If that requirement is satisfied, the user may have access to any number of secure applications 610 that are part of the secure partition 505. As such, this concept is particularly useful when dealing with operating systems that support the creation of virtual partitions.

The description herein, however, is not necessarily limited to a computing device 100 that provides two separate partitions, as such features may be applicable to a device 100 that has an operating system that does not graphically support multiple partitions or workspaces. In this case, the computing device 100 may be limited visually to a single partition, and this single partition may present both secure and non-secure applications. The processes and features presented up to this point and beyond—particularly namespacing and the isolation of certain applications, data and processes—apply to the computing device 100 with a single (visual) partition, although several additional elements will be described here that can help ensure proper performance.

Figure 9:
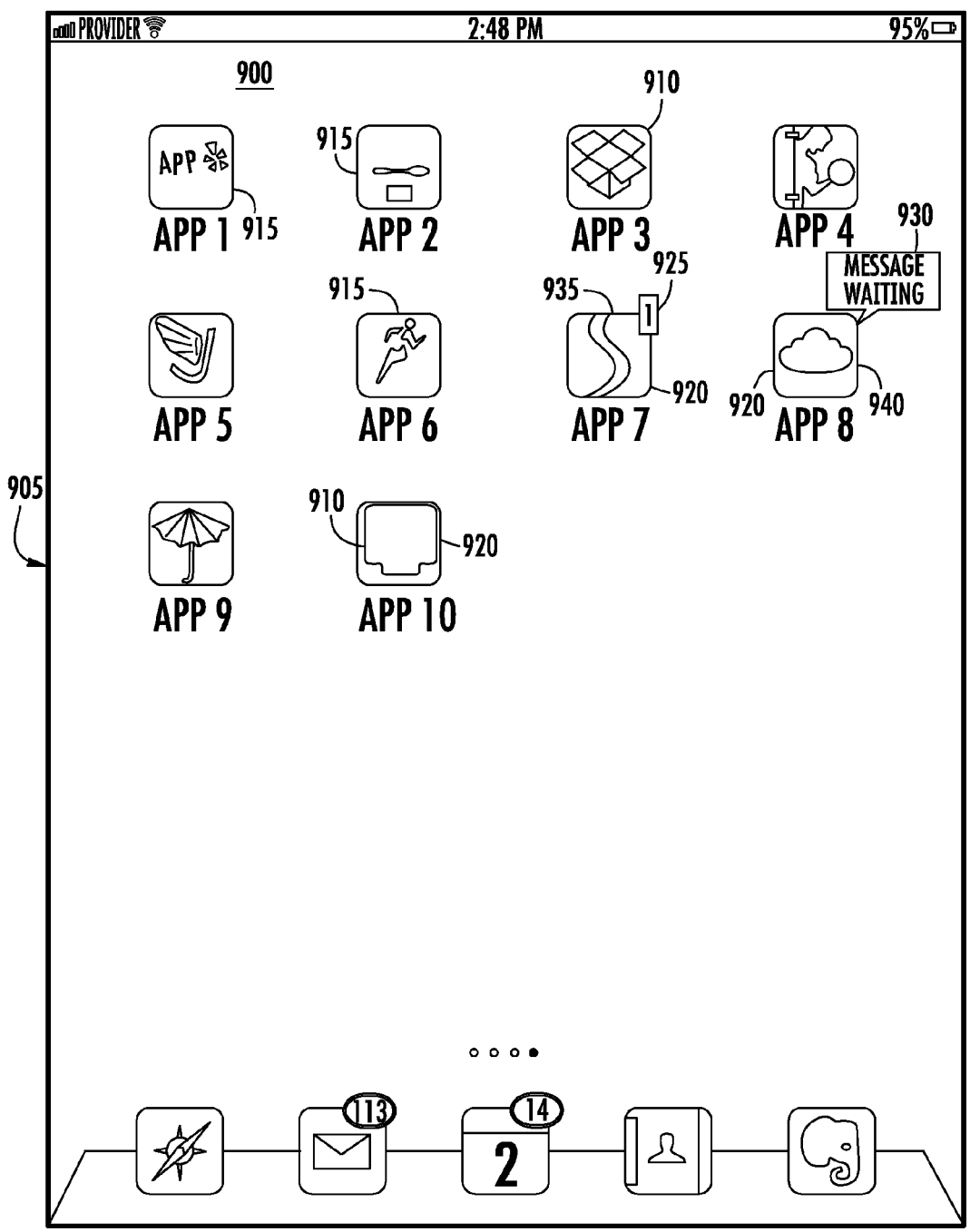
FIG. 9 illustrates another example of a home page.

Referring to FIG. 9, an example of a home page 900 is shown in which the home page 900 is part of a visually single desktop or partition 905. The home page 900 shows a number of applications 910 that may be installed on a computing device 100. Some of these applications may be personal or non-secure applications 915, and some of them may be secure applications 920. The concept of the secure applications 920 is similar to that previously described in that the secure applications 920 may be configured to prevent unauthorized access to the secure applications 920 and any data that is associated with them. That is, namespace enforcement to restrict access to inter-process communications or other system events may be part of this arrangement. Moreover, the data that is associated with these secure applications 920 can be encrypted. Each of the features and concepts described above and to be presented below is applicable to a single partition arrangement.

If a user wishes to access a secure application 920, the user may be required to undergo authentication before doing so. Several examples were previously presented, and they apply here, too. In one example, a user may be required to enter a password before the secure application 920 can be launched. In one arrangement, this password or personal identification number (PIN) can form part of an encryption key for encrypting data associated with the secure application 920. Moreover, this authentication process may apply to all the secure applications 920 that are part of the single partition 905 such that a user may be required to be authenticated each time a secure application 920 is launched. In another arrangement, a user may be authenticated in a single event, and this authentication may provide unhindered access to any secure application 920 during a time frame or at least to secure applications 920 that are related in some way. One example of such a relation is when the same entity signs the certificate for a group of secure applications 920. The time frame can be a predefined amount of time, or can end upon the detection of an event, such as if the computing device 100 is powered down.

In yet another arrangement, a grace period can be applied to any one of the secure applications 920 to increase the convenience for a user. For example, a user may launch a secure application 920, may be authenticated for that launch and then may close the application 920. If the user then attempts to launch the application 920 again within a predetermined time frame, it may not be necessary to undergo another authentication process. This predetermined time frame can be set to any suitable amount of time, with a balance being set between convenience and security. These principles may also apply to a computing device 100 that is capable of supporting multiple partitions.

In view of the single partition arrangement, steps may be taken to assist the user in identifying those applications 910 that are secure applications 920. For example, an indicator 925 may be assigned to one or more secure applications 920, which can provide notice to the user that an application 910 is a secure application 920. The indicator 925 can take on any suitable form, such as a simple icon or text-based message. In addition to or in lieu thereof, a message or some other notification may be displayed or broadcast when an attempt is made to launch a secure application 920.

The concept of a muted notification was described earlier, and this feature may apply here, as well. For example, in the single partition 905, a secure application 920 may receive a message or some other notification that may be important to the user of the computing device 100. To protect the data associated with the secure application 920, a non-descriptive notification 930 may be displayed over or next to the secure application 920 that has received the message. The notification 930 can inform a user that the secure application 920 has received a message or some other content that may be of interest to the user.

In a (visually) single partition scheme, it may be useful to aggregate or compile the secure applications 920 in a useful setting. For example, a folder (not shown) or some other similar element can be generated to store secure applications 920. In this case, when the user installs a secure application 920, the folder can be automatically generated and can automatically house the secure application 920. Each time a secure application 920 is installed, the application 920 can be designated for the folder (or even multiple folders). If the folder cannot be automatically generated, then processes can be implemented in the computing device 100 to enable the user to manually create the folder. As an option, a user may be required to be authenticated prior to accessing the folder. Once confirmed, the user may not be required to be authenticated again to launch any of the secure applications 920 in the folder. As another option, the user may still be required to be authenticated when launching any individual secure application 920, irrespective of whether the user must be authenticated when accessing the folder.

Referring once again to FIG. 9, during the initial installation (see previous explanation), a management application 935 can be installed on the computing device 100, an example of which is shown here. As part of this initial installation, several secure applications 920 may be downloaded on the device 100 and one or more settings and configurations may be implemented on the device 100, similar to processes previously referenced to and described. Additional secure applications 920 may be retrieved from an application repository, an icon 940 for which is shown in FIG. 9. The application repository may offer only secure applications 920 or both secure applications 920 and non-secure applications. As such, even though a computing device 100 may be configured to support a single partition, that partition may nonetheless provide access to secure applications 920 and the secure data and other content associated with them.

A description has been presented thus far that demonstrates that secure applications may be installed on a computing device, including devices that support a single partition or multiple partitions. The term "secure application" is defined as an application that has been modified to restrict communications between the application and unauthorized programs or devices or to alter or add features associated with the operation of the application. As previously mentioned, new functionality can be automatically injected into pre-compiled applications to create secure applications. This process, sometimes referred to as wrapping or securitizing an application, creates numerous possibilities for managing secure applications. The term "securitization process" is defined as a process of converting an application into a secure application.

As an example, an entity may develop policies that can be enforced against secure applications, and these policies may be dynamic in nature, meaning they may be altered at any time and propagated to a computing device 100 on which relevant secure applications are installed. That is, it is not necessary to define a policy within the code of a secure application. As such, policies may be configured by an administrator or some other authorized party via a web-based console and may be freely modified. Additionally, the policies can be managed for specific user groups, allowing an enterprise to have differentiated policy sets, even if the groups use the same or many of the same secure applications. This approach can ensure that specific versions of applications do not need to be created for each group of users and that secure applications abide by the latest required security policy. Examples of these policies and how they may be controlled or managed will be presented below.

To create a secure or wrapped application, a non-secure or unwrapped and pre-compiled application may be initially uploaded to any suitable portal or other suitable service. The non-secure application may be submitted without requiring the application developer to use or embed any third-party software development kits (SDK). Generally, application wrapping for all platforms works by interposing system API calls to allow a secure framework to intercept and control application functions. For example, as mentioned above, encryption can be used to ensure additional protection of the applications in the secure partition 505 of FIG. 5. In particular, processes associated with an application in the secure partition 505 can be intercepted to permit data to be encrypted when being moved to storage and decrypted when being retrieved from storage, including local and remote storage units. Additional input and output processes, read and write operations and other APIs can be intercepted for purposes of cryptography. Other processes can be considered. For example, references to standard libraries within the code of an application can be replaced for those of modified libraries or the actual libraries can be replaced with modified libraries. As another example, the concept of replacing references or libraries can be carried out to invoke additional operations at start-up or termination of the application, as well as any pause or resume activity. Modifications to the operating system or the application launcher (or manager) may or may not be part of this process.

Figure 10:
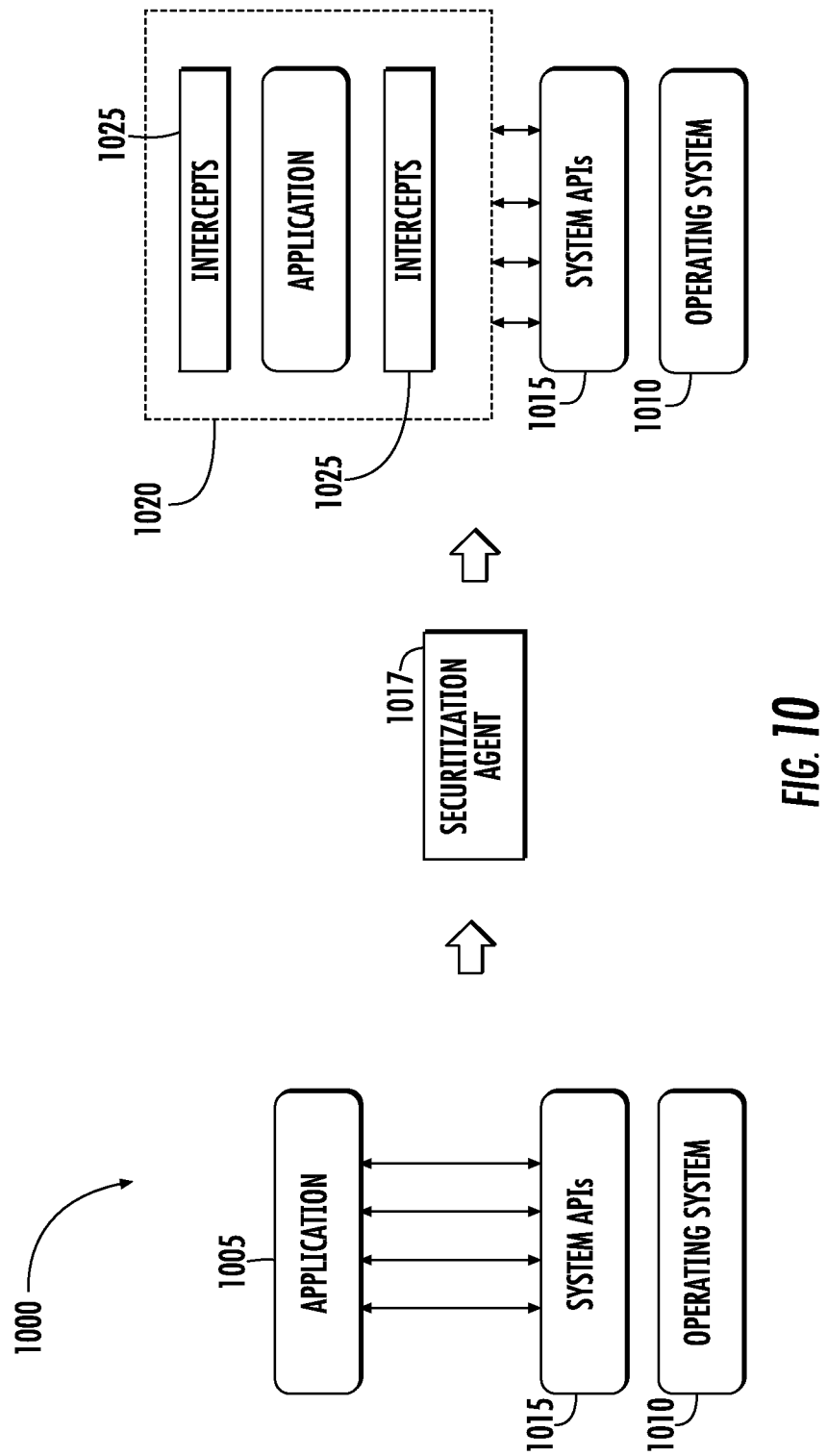
FIG. 10 illustrates an exemplary representation of a securitization process.

Referring to FIG. 10, a representation 1000 of the wrapping or securitization process is illustrated. Here, a conventional or target application 1005 is shown in which the target application 1005 is developed for operating system 1010 and calls system APIs 1015. At this point, the target application may be considered a non-secure application. The conventional application 1005 can be submitted to a securitization agent 1017, and the securitization agent 1017 and can subject the target application 1005 to the wrapping process to generate a secure application 1020. The securitization agent 1017 can include any suitable number and type of software and hardware elements to carry out the securitization process.

In view of this procedure, the secure application 1020 may still maintain its affiliation with the operating system 1010 and may still call the system APIs 1015. The overall utility of the secure application 1020, however, is increased because one or more intercepts 1025 may be interposed on the system APIs 1015. These intercepts may be representative of any number of policies that are set forth by a party in control of the secure application 1020 and any new or modified functionalities that are realized from the wrapping process, many of which will be shown below.

It is important to note that securitizing an application does not just add a dynamic library to an executable by simply modifying the header of an executable, a process that is easily undone and may violate development agreements associated with the application; rather, it can repackage the application so that the injected code is physically inseparable from the original code. This method prevents secure applications that may be modified by third parties from running within a secure environment, such as the secure partition 505 of FIG. 5.

As alluded to earlier, the wrapping or securitization process can preserve all the normal functions and APIs of a platform, while ensuring that protected information is handled securely. Application developers do not have to create applications or modify existing applications to accommodate this procedure and are not required to use any custom APIs or lose any functions associated with their applications. Calls to data sharing or data storage APIs may be automatically intercepted to ensure that sensitive enterprise data is handled appropriately. As such, secure applications may share data in the normal methods that are available on a given platform, but secure applications may not be able to share data with non-secure applications.

There are several ways to carry out the process of securing applications. The first scheme primarily focuses on byte-code injection, in which byte-code API calls are replaced with intercepts. As an example, this method is particularly applicable to—but certainly not limited to—certain applications formatted for the Android operating system developed by Google, Inc. of Mountain View, Calif. The second scheme chiefly centers on linking in replacement calls for native object code. This latter method is useful for applications that use native methods, such as Android applications that rely on native code (i.e., they do not run under a virtual machine) and applications developed for iOS, a mobile operating system developed by Apple, Inc. of Cupertino, Calif.

Figure 11:
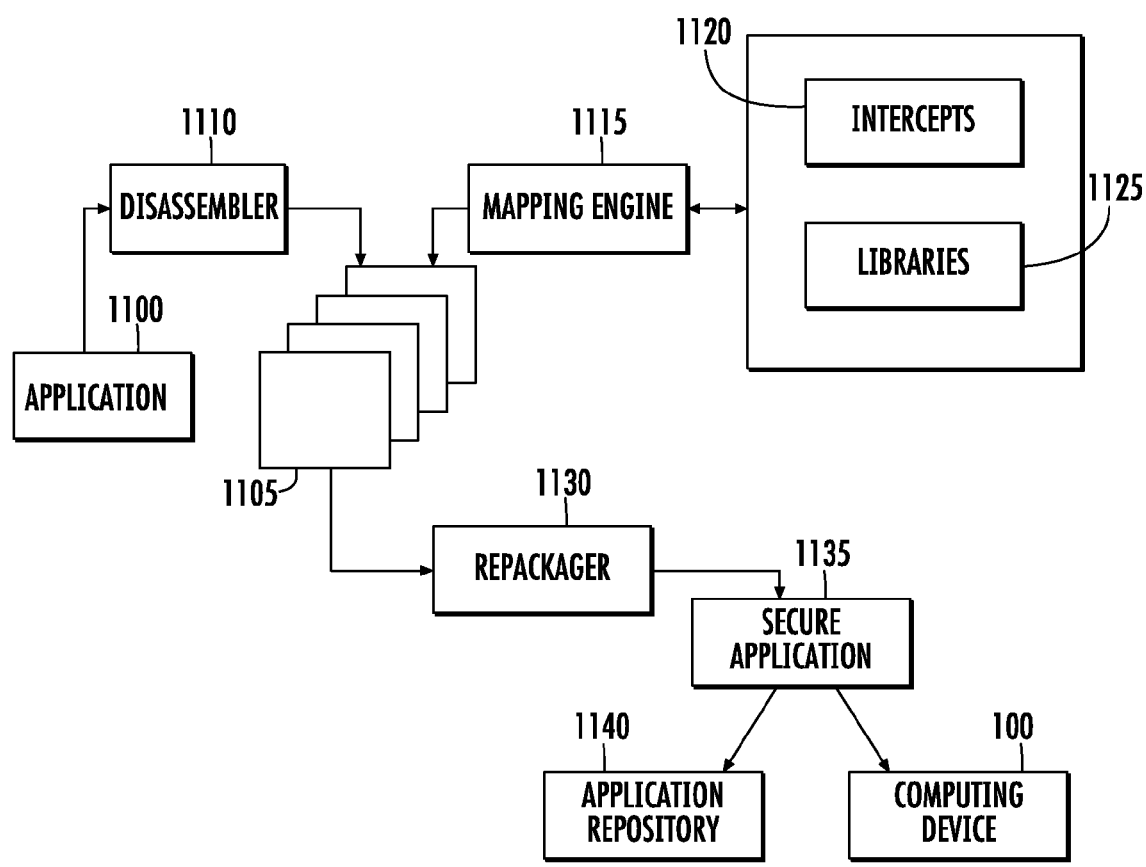
FIG. 11 illustrates a block diagram representation of an exemplary first securitization technique.

Referring to FIG. 11, in the byte code injection method, a non-secure application 1100 can be targeted, and a disassembler 1110 can deconstruct the application 1100 into files 1105 of byte code format. The disassembler 1110 can be any combination of both software and hardware elements for deconstructing the target application 1100. This deconstruction may involve converting class files into assembly files that employ predictable or known opcodes.

Based on the predictability of the opcodes, the byte code representation of the targeted application 1100 can be passed through a multi-pass process in which the requisite layers for any enforcement mandated by the secure partition 505 can be injected programmatically. For example, a mapping engine 1115 can serve as the securitization agent 1017 (see FIG. 10) and can identify conventional references or API calls associated with the application 1100 that may need to be adjusted based on the policies or other requirements imposed on the secure partition 505. In particular, the mapping engine 1115 can interpose intercepts 1120 on the existing references of the application 1100. Although additional discussion and examples will be presented below, an intercept 1120 may be a reference that, for example, ensures the security of the targeted application 1100 and any data associated with it, enhances the capabilities or functionalities of the targeted application 1100 or otherwise enables the management or control of the targeted application 1100. These modifications to the targeted application 1100 may be under the direction of any suitable entity, such as an enterprise who is interested in setting up a secure partition 505 on a user's computing device 100.

Consider the following non-limiting example. Secure byte codes that represent, for example, secure input/output (I/O), namespace enforcement and other security measures can be injected into the assembly representation of the targeted application 1100. Namespace enforcement can ensure that notifications, messages or any other suitable communications are not processed by any unauthorized applications or services, and a secure I/O scheme can ensure that persistent data is encrypted where necessary.

Continuing with this example, during each pass of the securitization process, the mapping engine 1115 can match or compare the references within the byte code representation—including but not limited to open source common elements—of the targeted application 1100 against or to a list of secure equivalents of the same objects. When a suitable comparison of a non-secure reference is made to a secure equivalent, the necessary bytes can be injected to replace the non-secure object with the secure version of the same object. It must also be understood that secure byte codes may be simply added to the target application 1100 as part of the securitization process, which may interrupt program flow of the target application 1100 and return it if one or more conditions (e.g., policies) are met.

With each pass of the securitization process, additional secure objects may be injected in the byte code representation. In addition, the security focus can be enforced to subsequently securitize the application 1100, impose the appropriate namespaces and perform modification of predictable key class methods (or other object representations) and APIs. This process can decouple the application 1100 from a non-secure runtime environment and can re-map the methods and interfaces for communication solely to the secure partition 505. It is understood that the securitization process is not limited to replacing pre-existing objects, as secure object references or other secure values may be added to the application being securitized to increase the functionality of the application. For example, certain features may be integrated into the application 1100 to permit the application 1100 to realize new functions or to be controlled in new ways.

In addition, as part of this process, the mapping engine 1115 can implement one or more libraries 1125 into the system to enable the execution of the secure methods or other processes that are part of the newly-securitized application. These libraries 1125 can be provided when the securitization process is being performed and can be applicable to any number of securitized applications. This process may also involve the modification of pre-existing shared libraries to ensure proper operation of the securitized application.

Following the passes of the securitization process, additional sets of instructions can be added to the byte code representation of the target application 1100 during the reconstruction phase, which can be carried out by the repackager 1130. The repackager 1130 can be made up of any suitable combination of software and hardware elements to carry out the reconstruction phase. These additional object files can augment, supplant or otherwise satisfy the secure object references injected during the previous passes. During reconstruction, resolution of any of the modifications imposed on the target application 1100 can be realized. In addition, the reconstructed and modified application 1135 may need to be resigned with a new certificate so that it may be trusted. At this point, the modified application 1135 can be made available for inclusion in the secure partition 505 as a secure application 610. As an example, the modified or securitized application 1135 can be made available to an application repository 1140 or may be pushed to a user's computing device 100.

It must be noted that the overall level of securitization or modification of a targeted application 1100 is configurable and can be adjusted to meet the needs of any suitable entity. For example, a greater number of secure objects may be injected into the byte code representation of a targeted application 1100 to increase the protection offered by the secure partition 505. Additionally, a lower number of secure objects may be employed to minimize security restrictions applied to an application within the secure partition 505. For example, an entity may wish to avoid making certain I/O processes or events completely secure, like an attachment manager for the secure e-mail application 615.

Although primarily described here in terms of ensuring the security of a targeted application 1100, it is understood that the securitization process is not so limited. For example, these principles apply to modifications of the application 110 that may cause the application 1100 to realize increased functionality or to enable management or control of the application 1100. That is, pre-existing object references related to the management or control of an application may be replaced with references that enable a management feature, such as hours of operation, to be imposed on the application when it becomes a secure application. Additional examples will be presented later.

Figure 12:
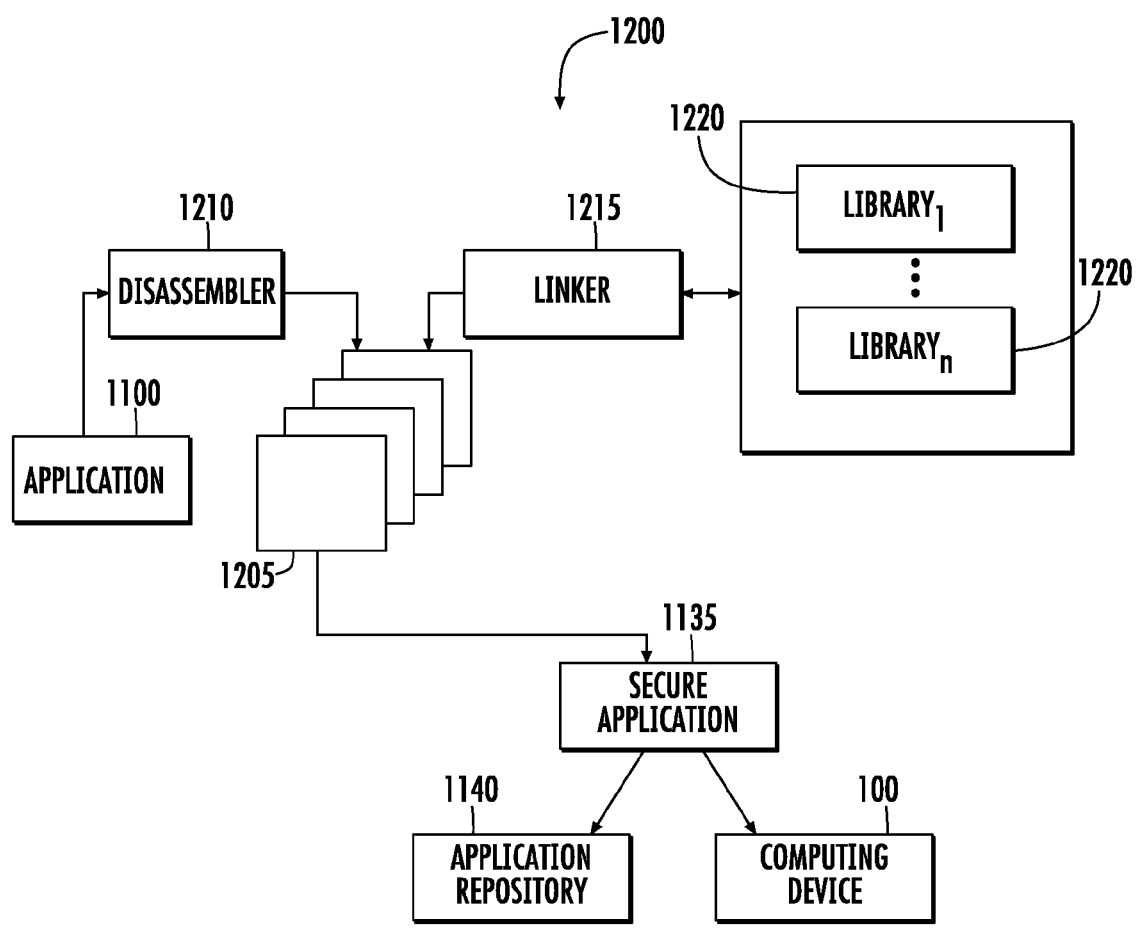
FIG. 12 illustrates a block diagram representation of an exemplary second securitization technique.

As explained earlier, there is another injection method that is useful for applications that rely on native methods, a process that may be referred to as link injection. Referring to FIG. 12, a system 1200 for carrying out this technique is shown. Here, similar to the description relating to FIG. 11, a target application 1100 may be obtained and decomposed into its binary components 1205 by a disassembler 1210, which can include any number and type of hardware and software elements for doing so. As part of this technique, any number of libraries or other subroutines may be developed, and these libraries may be related to the policies or features that are required by the environment of the secure partition 505. That is, the libraries may be generated that can enable various features to be integrated into the target application 1100 during the securitization process. The development of these new externals may revolve around the existing system APIs that are currently supported by the computing device 100.

Once the application 1100 is decomposed, a linker 1215 may programmatically inject into the disassembled code certain new instructions by selective satisfaction of external references using the securitization libraries 1220 or any other subroutines. This process may involve the replacement of pre-existing system calls or the inclusion of new instructions directly in the resulting application to form, for example, an immutable entity. Thus, the new libraries 1220 may be embedded in the target application 1100 (i.e., statically linked), or they may be simply dynamically linked. In either case, the linker 1215 may alter the linking order as necessary. By altering the linking order, it can be ensured that the new or secure libraries 1220 are given priority over the pre-existing system libraries during runtime. Even though the new libraries 1220 are given priority, calls may still be made to existing system libraries, such as from the new libraries 1220, where necessary. The linker 1215 may resolve all references to ensure that resolution of the linking process is achieved. Following which, a system of obfuscation may be applied to the output of the linking process, thereby preventing further modification or reversal of the securitization process. At this point, a secure application 1135 may be ready to be deployed, such as to the application repository 1140 or the computing device 100. In this case, the linker 1215 may serve as the securitization agent 1017 (see FIG. 10) and can be constructed of any suitable number and type of hardware and software elements for carrying out these processes.

In one arrangement, the new secure application 1135 may need to be resigned to be deployed. That is, the certificate applied to the original non-secure application 1100 may no longer be valid. Therefore, the new secure application 1135 can be resigned with a certificate, which may be related to any suitable entity.

In either method, the ability to integrate various features into a secure application is facilitated by prior knowledge of the existing system APIs and any dependencies that need to be maintained to ensure proper process flow. Moreover, a set of default references (new or replacement references) may be developed to be imposed on all applications that are to undergo the securitization process. As another option, a set of default references may be generated for a specific group of such applications, such as those with one or more common characteristics. In addition, custom references may be developed for certain applications. If a certain target application does not support a new feature that would typically be integrated into it as a secure application, there is no affect on performance because the application may simply ignore the external calls.

In view of the encapsulation of secure applications and the securitization or wrapping process described above, there are numerous avenues available for managing or otherwise controlling such applications. Two examples that apply, which were previously discussed, are encryption of data and the muting of notifications. Concerning encryption, once a non-secure application has been converted into a secure application, data that is associated with the secure application may be encrypted when being moved to storage or offered to some other process and subsequently decrypted when retrieved. For example, a write operation associated with a non-secure application may be reconfigured as a secure write operation such that the relevant data associated with that operation is encrypted.

To achieve this encryption, a secure application can make a request of a key service within a secure partition to obtain a unique key for the encryption/decryption of data that is associated with that secure application. If desired, each secure application can obtain a unique key for encryption/decryption of its associated data. The central generation and assignment of a unique security key on a per application basis within the secure partition can provide the benefit of preventing a first secure application from obtaining a key that is capable of decrypting another secure application's persisted data. Of course, when authorized, one secure application may be able to decrypt the data associated with another secure application, such as through the use of a shared key. In an alternative arrangement, keys can be generated at a component that is communicatively coupled to the portable computing device, including at a remote location, and the application can request the key from this external component.

The process for intercepting events for muting notifications can follow the same construct as the encapsulation of inter-process communication described earlier. In addition, a mapping between the imposed namespace within the secure partition and the original identity of the event (e.g., notification) known to the personal partition (non-secure runtime environment) can be maintained. As an example, this feature can support the replacement and propagation of notices sent from (or sent to) the secure partition or even between or among secure applications.

Figure 13:
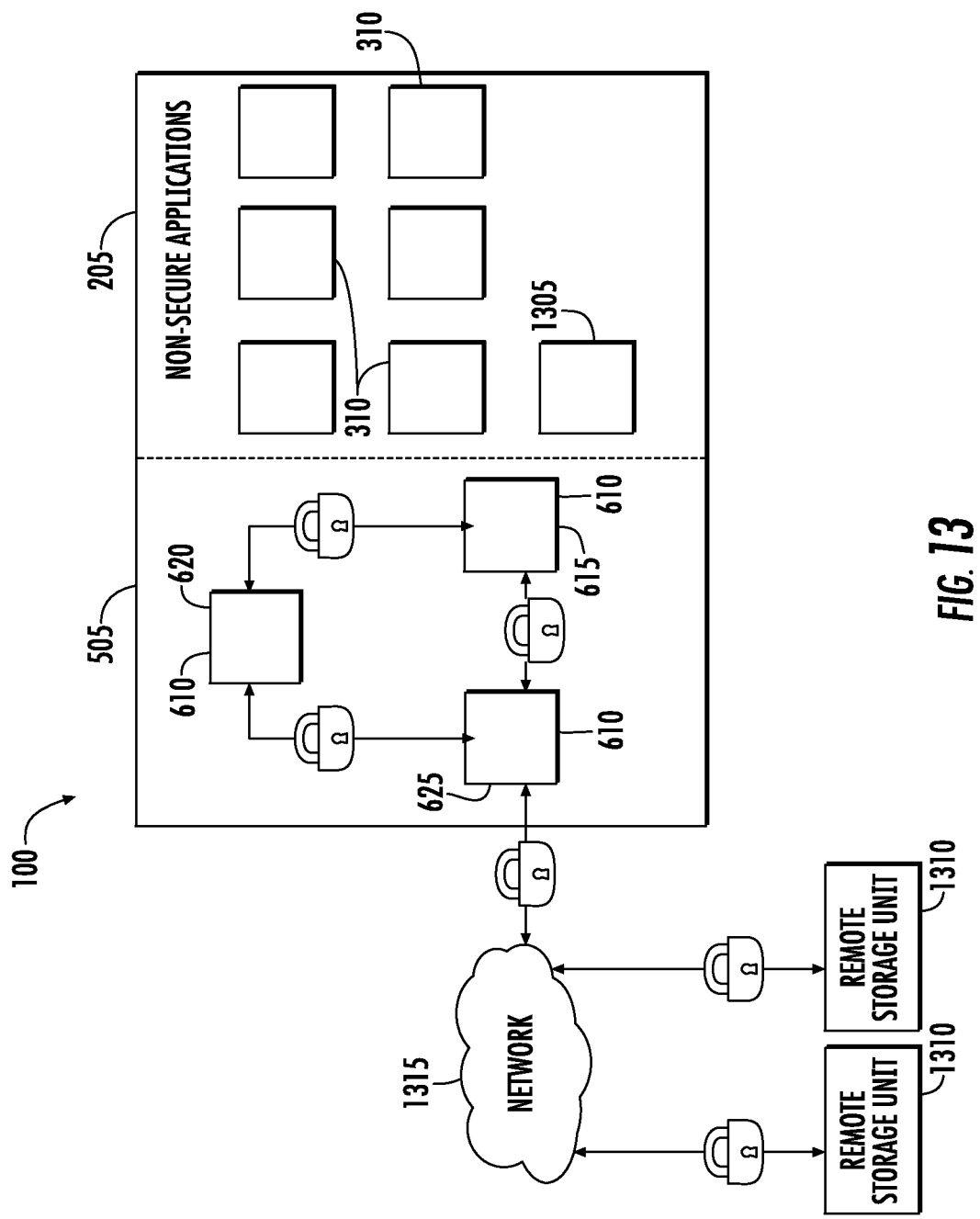
FIG. 13 illustrates an example of a computing device that is provisioned with a secure partition and a non-secure partition.

An example of how these features may be employed will be explained in reference to FIG. 13, which shows the computing device 100 having been provisioned with a secure partition 505, a number of secure applications 610, a personal (i.e., non-secure) partition 205 and a number of non-secure applications 310, one of which may be a non-secure email application 1305. One of the secure applications 610 may be the secure email application 615, first introduced in FIG. 6. Two other exemplary secure applications 610 include a document access application 620 and a document sharing application 625. The document access application 620 may enable a user to access, edit and synchronize various documents from numerous locations. The document sharing application 620 may enable a user to upload documents to, for example, remote storage units 1310 for access by other users. These remote units 1310 may be accessed through one or more networks 1315 and, as an option, may serve as the file system for the computing device 100.

In this example, the secure email application 615 may receive an email that includes an attachment. The encapsulation process can ensure that the email, the attachment and any notification of the receipt of the email and the attachment may not be received by the non-secure email application 1305 or any other non-secure application 610. If authorized, however, the attachment (and possibly, the email) may be shared with the document access application 620 to permit viewing and editing of these documents. The documents may also be shared with the document sharing application 625 to enable the documents to be stored to one or more of the remote storage units 1310 via the network(s) 1315. At any suitable time, the data associated with the email and the attachment may be encrypted and decrypted. For example, the email and the attachment may be encrypted when being written to a remote storage unit 1310 and subsequently decrypted when being retrieved. In addition, if the secure email application 615—prior to being converted to a secure application 610—would normally provide a full notification to some other non-secure application 310, a new notification process could be imposed such that the non-secure application 310 receives a muted notification that reveals no confidential or sensitive information.

While content received and generated at the secure partition 505 may be restricted from the personal partition 205, the same may not necessarily be so for content received and generated at the personal partition 205. For example, if the non-secure email application 1305 receives an email and an attachment, these documents may be shared with one or more secure applications 610, as an option.

The processes described so far illustrate how a non-secure application can be converted into a secure application. These concepts can be expanded to enable the secure application to be secure and remotely managed and to permit its features to be enhanced. The expansion of the utility of such secure applications may be in accordance with one or more policies. The term "policy" is defined as a predefined configuration, rule, guideline or directive that may be imposed on a secure application by affecting, determining or setting the operation of the secure application. These policies may be defined and managed via a network-based management portal by any suitable party, such as the enterprise that has generated the secure partition and the delivery of the secure applications (or that has caused such steps to be taken). In addition, the policies may be dynamic in nature, as at least some of them may be reconfigured at any suitable time. It must also be noted that policies may apply to individual secure applications or groups of them, irrespective of whether the secure applications are related to one another or are permitted to exchange communications with one another. In fact, some policies may apply to all secure applications in the secure partition or the secure partition specifically.

It must be understood that a policy may serve as any rule, guideline or directive that may cause a secure application to execute in a certain way. For example, a policy may be designed to ensure that a secure application will encrypt any data that it writes to storage or transfers to another process. This policy may be imposed upon the secure application during the securitization process, and the secure application may be configured to encrypt such data during a writing operation.

These policies may be delivered to the computing device 100 such that they are stored locally. Even so, they may be stored remotely to be retrieved during loadtime or runtime of a secure application. As an option, a secure management application may be installed as part of the secure partition. The secure management application may be responsible for managing the receipt of policies and updated configurations related to those policies already received at the computing device 100.

Although the ways in which the operation of a secure application may be altered are numerous, there are several distinct but non-limiting categories that will be presented in an effort to demonstrate some of these possibilities. Any one of the processes associated with these categories may be realized as a result of the securitization process. Exemplary embodiments of how a secure application may be managed, how it may be secured and how its features may be enhanced, each of which may be in accordance with one or more policies, will now be discussed.

Concerning management of a secure application, a policy may be set that restricts the hours that a secure application may operate. If the secure application attempts to launch during a restricted temporal period, the impositions that result from the securitization process may override the normal system APIs, and the secure application may be prevented from doing so. Another policy may be imposed that prevents the secure application from launching based on a geographical location of the computing device 100. For example, an enterprise may wish to bar certain secure applications from launching while the computing device 100 is located in a certain building or room. The location of the device 100 may be determined through any suitable process, such as through GPS, network triangulation or simply by the access point or service set identifier (SSID) on which the device 100 is operating. Moreover, a secure application may be allowed or disallowed from launching based on the availability of a specific server or network connection, and network access for a secure application may be completely blocked based on certain criteria, like time of day or location.

In another arrangement, a secure application can be completely blacklisted, meaning that it can never be launched, while such an application may also be permanently enabled (or whitelisted) so that the application may be permitted to launch at all times, irrespective of any external conditions, like time of day, geographic location or SSID connection. These restrictions may also apply to access to the secure partition itself. That is, one may not be permitted to access the secure partition based on, for example, time of day, location or network connection.

There are several other checks that may be integrated into the operation of a secure application. For example, when the secure application is launched, a policy may be in place that only permits its operation if the secure application is in compliance with a licensing model. A licensing model may enable an enterprise to launch a certain number of copies of an application at any one time or any number of copies of an application for a predetermined time period. Of course, a licensing model may be perpetual in nature, which could permit unfettered use of an application for any number of users. In either arrangement, a secure application may be prevented from fully launching until the system determines that the application is in compliance with a license that is attached to its operation.

An administrator may also send messages to an individual secure application. For example, the capability to communicate to a specific secure application may be achieved through the creation of a message channel and associated action methods, which can be part of the process of securitizing an application for inclusion in the secure partition. In particular, a listening agent for an application's message channel can be introduced during one of the phases of the multi-pass securitization process previously described, along with the methods required to satisfy the allowable actions that may be communicated to the application via its message channel. One such example is a revoke or uninstall action for removing a secure application from the secure partition. Other examples include directives to wipe or delete persisted data (even if encrypted) or to return to a known state. Any number of secure applications and any amount of data may be deleted, including the entire secure partition, if so desired.

The discussion here will now focus on several examples of security features that may integrated into a secure application from the securitization process. For example, a policy can be implemented that locks or deletes a secure application if the computing device on which the secure application is installed has been offline or disconnected from a certain network for more than a predetermined amount of time. Additionally, if a secure application has been inactive after launch for greater than a certain amount of time, a user may be required to re-enter a password to again access the application. Another example of a security feature that may be attached to a secure application is that the secure application may be locked or deleted if a password associated with the secure application has been incorrectly entered more than a predetermined number of times. In fact, the securitization process may enable an enterprise to force passwords to be entered for individual secure applications or groups of related secure applications. As such, a secure application may not be launched unless a correct password is entered. Password guidelines or rules may be defined by a policy, and some examples include the overall strength of a password or a timeout value that may force a user to re-authenticate the password after a certain amount of time. It is important to note that the description here is not necessarily limited to the use of passwords, as other forms of authentication may apply, such as biometric authentication.

Another concept that the securitization process may imbed in a secure application is the ability to enable or disable the use of external storage, irrespective of whether the data associated with the secure application is or will be encrypted. For example, the secure application may be required to write its data (encrypted or unencrypted) to a secure remote storage unit. Alternatively, if the secure application has the ability to write data to such a remote unit, the securitization process may intercept this ability and may deny the ability of the secure application to save any data remotely, or the secure application may be allowed to save such data only to authorized remote units.

As previously noted, the securitization process may dictate to a secure application that the data associated with a secure application be encrypted prior to storage or before being transferred to some other component or process. In one arrangement, an encryption key may be generated for each secure application and may be encrypted with a user password. In addition to applying to data that is written directly by a secure application, a policy may be set such that data that is associated with a first secure application but moved to storage by another application (secure or non-secure) or process is encrypted.

As also presented earlier, communications and data-sharing between applications, particularly between secure and non-secure applications, may be restricted. One particular example of this feature is a restricted copy and paste operation. For example, an authorized first secure application may be permitted to copy data from an authorized second secure application or an authorized non-secure application and paste that data into the first secure application (or some other suitable process). A non-secure application, however, may not be permitted to copy data from a secure application.

Another example of a security policy that may be integrated into the operation of a secure application is the performance of a privileges check upon the launch of a secure application. For example, many computing devices have restrictions imposed on them that limit certain privileges on the devices. In some cases, unauthorized modifications may be made to the devices to overcome these restrictions, a process commonly known as jailbreaking or rooting a device for certain operating systems. If such an unauthorized modification is made to a computing device and then detected, any number of secure applications may be prevented from launching or even deleted from the device.

It should be noted that all features described in relation to the management or security of an application may apply to groups of secure applications or the entire secure partition. For example, the entire secure partition may be deleted from the computing device in view of certain events, like if the device has been offline for longer than a certain amount of time, if a password has been entered incorrectly more than a predetermined number of times or if the privileges restrictions on the device have been modified without permission. Similarly, access to the secure partition may be blocked based on, for example, a time of day, a location, the availability of a particular network or modification of the restrictions on privileges.

In addition to the management and security aspects of secure applications, the functionality of a secure application may be increased during the securitization process. That is, the process of securitizing an application may add features to the application that were not available, necessary or required at the time the application was originally developed. These features may be added without obtaining the source code of a target application, and no input is needed from the original developer of the application.

Several non-limiting examples will now be presented to demonstrate how the wrapping process—both through the byte code and linking injection techniques—can enhance the functionality of a secure application. In particular, a secure application may be provided with the ability to store data at an authorized remote storage unit in addition to or in lieu of local storage, even if the secure application—prior to be securitized—did not have this capability. Once modified, the secure application may use the APIs provided by remote storage vendors or services, and this may apply to file operations other than simply data storage. For example, the secure application may be able to provide access to a confidential document for editing or review.

As another example, the system APIs that a particular secure application would normally use for video streams may be identified, and the securitization step may enable the replacement of a pre-existing camera stream. Specifically, a secure application that uses a camera may have the stream normally employed by that camera to be replaced by some other source, such as from stored video, from another camera or any other suitable video input, like the display of a user's computing device or other component. Consider the following scenario. A target application may support video conferencing in which a video stream from a camera may transmit images of a participant's face. The target application, however, may not be designed to transmit images of the participant's display of a computing device, which may show documents, messages, web pages, etc. During the securitization step, the target application may be configured to accept and process images from the participant's display as a secure application, thereby enhancing its operating capabilities. In fact, the participant may be given a choice among any of the available video sources.

Another way to increase the functionality of a secure application is by enhancing its input/output (I/O) capabilities. Consider a target application that was originally designed to recognize and react to touches on a display of a computing device. During securitization, the target application may be modified to receive inputs from a new input device or to provide signals to a new output device. For example, a mouse, keyboard or some other input device may be communicatively coupled to a computing device, such as through Bluetooth or another wireless standard or protocol. The secure application on the computing device can receive and process the input signals as it normally would for touch event signals. In one arrangement, a separate thread of execution that listens for mouse inputs may run concurrently with the secure application and can call the secure application with an event when it detects a mouse input, an event that is similar to that which would be generated for a touch event on the display of the computing device. In one arrangement, this mouse capability could be added to virtual desktop infrastructure or virtual desktop interface (VDI) applications or remote commands may be received via a network.

Figure 14:
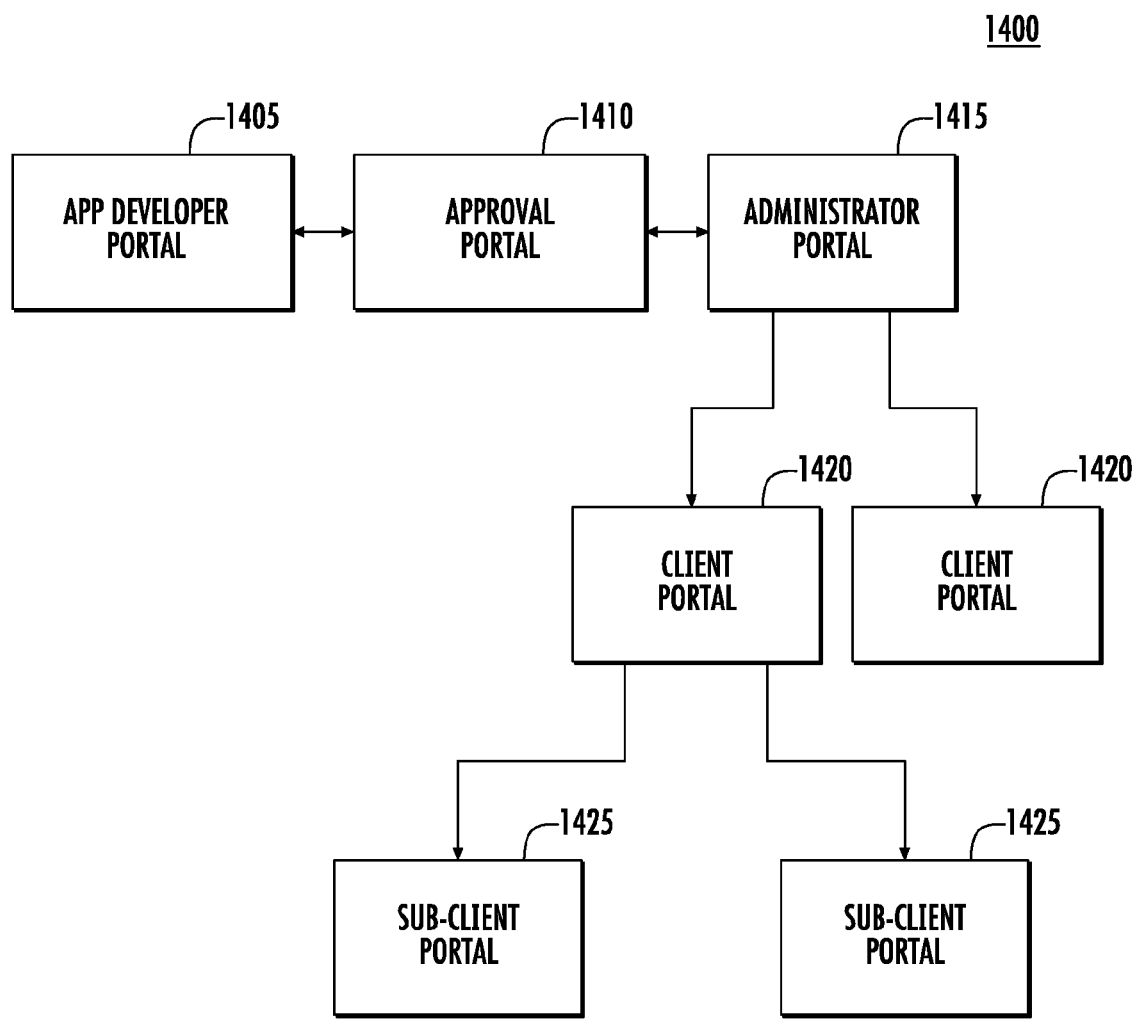
FIG. 14 illustrates an example of a system that includes several portals that may participate in the acceptance and delivery of an application.

Any number of platforms can be utilized to modify applications for inclusion in a secure partition. For example, referring to FIG. 14, a system 1400 that illustrates several portals that may participate in the acceptance and delivery of an application is shown. An application developer may upload an application at an application developer portal 1405 for eventual approval and distribution to any number of entities, including the publication in one or more application repositories. The submitted application may be sent to an approval portal 1410, where the application may be reviewed for its suitability for distribution. If approved, the application can be sent to an administrator portal 1415, which can allow an administrator to distribute the application to one or more client portals 1420. Once received at the client portal 1420, it can be determined whether the application is to be made available at an application repository associated with the client portal 1420 or distributed in some other way. In addition, the application may be sent to one or more sub-client portals 1425, where it may also be decided to publish the application to another application repository associated with the sub-client portal 1425 or to further distribute.

It is important to note that the securitization process described above can be performed at any of these portals. For example, the submitted application, once approved at the approval portal 1410, may be converted to a secure application at the administrator portal 1415 and submitted to the client portals 1420. In addition, once received at a client portal 1420, the secure application may undergo another securitization process and may be further distributed. Thus, a secure application may be subjected to the securitization process multiple times and at different portals or computing devices.

As previously mentioned, when a secure application is created, the secure application can be made available for inclusion in a secure partition. As an example, the secure application can be uploaded in an application repository. In one arrangement, the application repository can be a secure application repository that can be authorized to offer secure applications or other secure content for installation on authorized computing devices. The secure application repository may be configured to only accept secure applications, but the description here is not necessarily limited as such, as the secure repository may also offer non-secure applications or other content.

In one arrangement, once available at the application repository, the secure application can be downloaded to a computing device that has a secure partition. For example, the user of the device can access the application repository and can download and install secure applications from the application repository. As another example, one or more secure applications can be automatically transferred to the computing device, such as when the secure partition is created. In one particular example, the secure applications can be transferred to the computing device as part of a bundle. That is, secure bundles can be prepared for download and installation on a computing device, and the secure bundles can include one or more secure applications designated for the secure partition of a computing device. As part of the installation of a secure application, a user or some other person/entity may be required to provide authentication information before the secure application is permitted to be downloaded and/or installed.

As previously explained, a user can install an application or client on his/her computing device, which can cause the generation of a personal partition and a secure partition. As part of this process, the computing device can become a managed device. The level of management provided to the computing device can be set according to the wishes of the user and the managing entity (or some other entity), given that the device belongs to the user. As an example, there may be no management of the personal partition or of the features of the computing device when the personal partition is active. When the user switches to the secure partition, however, management of the computing device and elements of the secure partition may commence. As another example, the user may also permit such management of the elements of the personal partition and the computing device when the personal partition is active. As such, the level of management that is applied to the computing device, the personal partition and the secure partition is completely configurable based on the requirements of one or more parties and may even be adjusted following an initial setting. A partition (secure or personal) that enables management of settings, applications, hardware or other elements associated with that partition can be referred to as a managed partition.

There are several examples of device management, and they are applicable to the computing device that has been configured with the personal partition and the secure partition. For example, information about the device and its location can be provided to a managing entity, and the managing entity can send messages to the device and can cause the device to ring to help locate it. In addition, the computing device can be locked and unlocked, a user can be logged out (i.e., forced to logged out), data and applications can be wiped (or deleted), settings or other parameters can be set and a user's account can be wiped. These features can apply to the entire computing device or to any of the partitions, such as the secure partition.

Consider the following example. A user may own a computing device that includes a secure partition, and the device can be managed by the user's employer. The secure partition in this example may include secure applications and data that the employer considers as protected information. If the user/employee's position is terminated, the employer may have the entire secure partition or at least some part of the secure applications and data in the secure partition wiped from the user's device. As such, the user's personal data and applications (i.e., the personal partition) can avoid being affected. This exemplary process can apply to any number of partitions of the device, including an arrangement where there are multiple users assigned to the device.

There are other examples of device management that are applicable here. For example, password, Wi-Fi and VPN profiles can be imposed on the computing device, and certain hardware elements—like a camera, a Wi-Fi stack, a cellular stack, an SD card module, a Bluetooth stack or a microphone—of the device can be configured or modified. Moreover, certain certificates or policies can be imposed on the computing device, such as proxy policies, application whitelist policies, application blacklist policies, VPN policies and report policies. These profiles, certificates and policies may be delivered to the computing device on an individual basis, or some of them may be packaged together for delivery to the device in the form of a bundle.

The device management examples presented above can apply to the entire computing device, the personal partition, the secure partition or any suitable combination. For example, the profiles, certificates and policies may only apply to the computing device when the user is operating in the secure partition (i.e., these features may not be applicable to the personal partition). As a more specific example, a VPN policy can be imposed on the device when the user is operating in the secure partition to ensure that any communications associated with the device are protected. As another specific example, when the user is operating in the secure partition, certain hardware elements of the computing device can be disabled, like a camera or a microphone. Continuing with the example, when the user switches from the secure partition to the personal partition, the hardware elements can be enabled again. The hardware elements or other certificates, policies and profiles may also be configured or altered based on a time of day, a predetermined event or the location of the portable computing device, irrespective of or dependent on whether the user is operating on a particular partition.

As described above, the computing device or any partition may be managed in accordance with the processes presented herein. As also explained earlier, individual applications may also be managed. That is, an application, no matter which partition it is assigned to, can be individually managed such that its access or operation can be controlled or manipulated in some way. There are numerous examples of how a secure application can be managed, some of which have already been described. The following is a non-exhaustive listing of several management techniques for an individual secure application: (1) a secure application can be installed or deleted remotely; (2) data associated with a secure application can be supplemented, updated or partially or completely deleted; (3) a secure application's usage statistics can be tracked and recorded; (4) a secure application's license can be validated prior to, during or following its operation; (5) a secure application may only be launched during certain times of the day, only when the computing device is in a certain location or a combination of the two; (6) a user may need to be authenticated prior to using the secure application; (7) data associated with the secure application may be required to be encrypted (and decrypted prior to retrieval for the secure application); or (8) the secure application's network connections may be restricted to a VPN or to specific access points or SSIDs. As such, the securitization of an application for inclusion in the secure partition has the inherent capability of a broad range of policy and profile enforcement through the introduction of pertinent hooks to key methods that conditionally allow or disallow execution of the application's original calls or methods based on defined criteria, in keeping with the intentions of the policy or profile author as the sections herein highlight.

For example, referring to the secure partition, any of the secure applications can be individually managed in accordance with one or more arrangements. Consider the following non-limiting example. Referring to a secure e-mail application in the secure partition, the secure e-mail application can be remotely installed on or deleted from the secure partition, such as by a managing entity. This installation/deletion can be on an individual basis, although it may occur as part of the installation or deletion of a group of applications. Moreover, any data associated with the secure e-mail application, such as a particular e-mail message, can be deleted remotely, and the usage statistics of the secure e-mail application can be monitored, such as under the direction of a remote command. Examples of usage statistics may include the number of messages received or transmitted, the amount of incoming or outgoing data, the number of calendar events, etc. Of course, any suitable number and type of usage statistics and parameters associated with an application can be tracked and recorded.

Continuing with the non-limiting example, a license associated with the secure e-mail application can be validated to permit a user to access the secure application. For example, there may be a floating license assigned to the secure e-mail application, which may limit the number of open applications at any particular time. When the user launches the secure e-mail application, it can be determined whether the opening of the secure application is permitted if the number of active users is limited to a predetermined number. If this predetermined number has not been exceeded, then the launching of the secure application can be completed. In contrast, if the number has been exceeded, then the launching of the secure application can be aborted, and the user can be informed of the inability to open the secure application.

As another example, access to the secure e-mail application may be restricted based on a particular time or the location of the computing device. Specifically, the secure e-mail application may only be available for launching or operation during working hours or some other predetermined time period. As another example, the secure application may only be available for use if the computing device is located at a certain location or within a predetermined coverage area. The time and location restrictions can operate individually or in combination with one another. These restrictions, in addition, may be applicable to the entire computing device, the personal partition or the secure partition. For example, the entire secure partition may be locked down outside of some predetermined time period or when the device is outside some predetermined location.

As another example, the computing device may be forced into a particular partition based on some predetermined event. For example, the device may be forced to operate in the secure partition based on time/day, location or network connection. In addition, the device may force or direct the launching of certain secure applications based on predetermined events. For example, a secure application may be launched based on time/day, location or network connection.

Authentication may also be required when accessing the secure e-mail application or any other individual application. This authentication process may supplement or supplant the authentication required for the user to gain access to the secure partition. For example, when launching the secure e-mail application, the user may be required to enter a password or to supply a biometric measurement. If authenticated, the secure application can be launched. In addition, any persistent data associated with the secure e-mail application can be encrypted for storage (and decrypted when retrieved from storage), in accordance with previous explanations.

As another example, the secure e-mail application may be restricted to the use of secure networks. For instance, when the secure application is launched, its network connections may be restricted to a VPN or to one or more access points or SSIDs. This may be in addition to or in lieu of any network restrictions imposed on the secure partition or the overall portable computing device.

It must be understood that the listing of management features here is not exhaustive and is not meant to be limiting. Moreover, some of the features presented here may not be applicable to each application in the personal profile or the secure partition. In fact, the level of management imposed on each application is entirely configurable and can be adjusted at any suitable time. For example, updates to any secure application can be downloaded to the computing device, and these updates may include additional features related to the operation (or any restrictions thereof) of the secure application. It must be noted that the management of the computing device and the applications of the device may be limited to the secure partition. This restriction makes sense because the managing entity may avoid problems with managing a user's personal applications, files, data, etc. It is understood, however, that management of such personal material is entirely within the scope of this description.

If an application is to be managed in some way, the application can be modified to accommodate such a feature. For example, code can be added to the application to force the application to make certain calls depending on the type of management feature. In one arrangement, this modification can occur during the securitization process described above, either before, during or after the byte code or linking injection process. Once modified, the application operates in conjunction with an application launcher to enforce the application management policies.

As noted earlier, certain policies can be enforced against the operation of, for example, a secure application in which such a process is overseen in accordance with these policies on a computing device. These policies, however, are not necessarily limited to local enforcement. For example, focusing on the secure e-mail application once again, when launched, the secure e-mail application can provide identification information, such as a unique identifier and an application name, to the application launcher. The application launcher can then cause the information associated with the secure application to be received at a remote server. The remote server can then determine whether there are any operational restrictions for the secure application or whether information is required from the secure application. For example, the server can determine that the secure application is limited to a particular set of access points for operation, whether a VPN connection is required for non-approved access points or if additional user authentication is needed. The application launcher (or some other element) can receive this restriction and can enforce it against the secure application. Of course, there are numerous other management policies that can be enforced against the secure e-mail application or other secure applications, as previously presented. The platforms through which a secure application can be modified to be managed may be similar to those described above in relation to the securitization process. For example, any of the portals of FIG. 14 can serve as a platform to enable the modification of an application for management. Alternatively, the computing device itself can be used to modify an application for management.

In view of a computing device being configured to provide a workplace environment, there are several other factors to consider. In particular, it is important to provide a setting on a computing device where users can maintain essentially the same level of productivity previously experienced on traditional laptop and desktop computers. In some cases, though, the hardware and operating systems associated with a computing device may not be capable of running productivity or enterprise software applications natively on the device. The configurations and processes described above, however, can solve this problem by enabling the introduction of virtual applications, which may also be referred to as remote applications.

For example, virtual applications can be part of the secure partition. Specifically, through the secure partition, a user can access remotely located applications, which can provide the user with an offering that runs just as if the application were native and local to the portable computing device. Advantageously, this feature allows the computing device to provide a virtualized workspace, one that can permit a user to access powerful applications, without requiring the device to have specialized hardware architecture or operating system features that would normally be required to run such an application.

In one arrangement, a user can identify in an application repository or some other suitable platform the appropriate application that he/she wishes to access. Once identified, an application connector can be downloaded and installed on the user's computing device, and an icon representing the virtual application can be installed and displayed on the computing device. In one embodiment, this virtual application can be presented in the secure partition, although it may be displayed in any other suitable operating environment, including the personal (i.e., non-secure) partition. The virtual application can look and operate like a conventional application. Here, however, when the virtual application is activated, the application connector can enable the computing device to establish a session with a remote location that hosts the actual application. A virtualization engine at the remote location can subsequently execute the requested application and can negotiate with the application connector on the computing device to establish the requisite data paths for relaying and honoring the necessary application controls. Thus, a user, through his/her computing device, may have access to virtually any type of application and may not even realize that the application is actually being hosted and run remotely.

These virtual applications may also be automatically pushed to a user's computing device, either individually or as part of a bundle offering. Moreover, the virtual applications and the sessions established with the actual applications can be managed just like the processes described above with respect to conventional applications. For example, before a virtual application is launched, a user may be required to provide authentication information, or the virtual application can be installed or deleted remotely. As another example, the virtual application may be limited to a particular network connection, and it may be necessary to determine whether the current session comports with certain licensing restrictions (e.g., a floating license situation). In fact, all the application management, security or enhancement features and their associated examples presented above may be applicable to the operation of a virtual application. As such, a virtual application may be a secure application.

Controls associated with a virtual application may extend to several data paths and services. One example of a service is a graphic interchange service. The graphic interchange service can provide for aspects of the presentation layer of the virtual application within the appropriate operating environment of the computing device to ensure a seamless and fluid graphical experience on the device. Another example is a mouse and keyboard event service. This service can account for the dissemination of mouse and keyboard events and subsequent application responses for application navigation and control, as well as data input and manipulation. This service may also apply to other input devices, such as a touch screen arrangement. Another example of a service is a file persistence service. The file persistence service can be responsible for aspects of file storage and retrieval by supporting user-selectable storage options. Non-limiting examples of such storage options include remote file synchronization with any suitable external storage service, such as that offered by Dropbox or GoogleDocs. Another option is to have data associated with a file related to a virtual application to be streamed directly to local storage in the secure partition, where it can be encrypted as previously described. In this way, unbeknownst to the user, interactions with the remote application appear to be contained entirely to the computing device.

The above description has focused on a user providing his or her own computing device and creating a secure partition on the device to permit sensitive applications and data, such as those associated with an employer or other organization, to be available for access on the user's device. It is understood, however, that a similar process can be performed for a computing device that is offered by an entity, such as an employer. For example, it has been described previously that an employer may provide computing devices for one or more of its employees, agents, contractors, etc. When activated, such a computing device can have various types of applications and data installed on the device in which the applications and data are associated with and most likely approved by the employer.

In accordance with the description above, the employer may allow the user of the employer-provided computing device to install an application or client that creates a personal partition, separate from the applications and data associated with the employer. In this arrangement, the user of the employer-provided computing device can, for example, install applications in the personal partition that may or may not be approved, controlled, managed or monitored by the employer. Additionally, the level of management provided to this type of personal partition—examples of which have been illustrated above—can be configurable and set according to the needs of the user and the employer. Moreover, the features presented above may be applicable to the personal partition, such as the requirement that a user be authenticated before being permitted to access the personal partition on the employer-provided computing device. Although the preceding example was explained in terms of a user-employee and an employer, the description herein is not limited to such a relationship, as other suitable associations or affiliations are within its scope.

Secure applications, as previously explained, may be generated for a computing device that only has one partition, visually speaking. Secure applications may also be individually managed in accordance with any of the features described earlier in relation to a multi-partition device. Moreover, the computing device itself can be managed in accordance with any of the processes presented above. This level of management can be tailored to accommodate the objectives of a managing entity and the privacy of the user of the single partition computing device. For example, the managing entity may be limited to managing the single partition device to when a secure application is active or at least open or suspended. If agreeable, however, the managing entity may also manage the single partition device at any suitable time.

As also noted earlier, some computing devices support the concept of multiple workspaces or partitions, and as such, a secure partition may be generated for such a device. This configuration is convenient for a user because the user may provide authenticating credentials to access the secure partition, and following that step, the user may access secure applications without having to repeatedly provide the credentials. As also pointed out before, however, it may not be permissible to visually create multiple partitions in a portable computing device in certain platforms. A user, in this case, may also have the ability to provide credentials a single time to access multiple secure applications, particularly if such applications belong to a family or are related in some way.

To facilitate the process of accessing secure applications in certain platforms, an authorization scheme may be implemented. In one arrangement, when a first secure application is activated and the proper credentials are provided, a grace period may be established that allows the user to re-access the secure application without again having to provide the credentials. This grace period can be set by any suitable entity, while balancing the competing interests of security and convenience. In one embodiment, no grace period may be provided, which means that a user will be required to provide the credentials each time a secure application is accessed.

In another arrangement, the grace period may be applicable to a group or family of secure applications, which may be related to one another. For example, two or more secure applications may be linked in such a way that providing credentials for a first secure application in the family may establish a grace period for any other secure application in that family. Thus, if the user provides the credentials for the first secure application and eventually closes it, a second secure application can be launched without having to provide the credentials, so long as that second secure application is launched before the grace period expires. As an option, this feature may only apply to applications that are part of a family. Thus, if the second secure application is not so registered, this convenient aspect may not apply. In either arrangement, once the second secure application is terminated, the grace period may begin to toll for the second secure application or any other authorized secure application.

In one arrangement, a management application may facilitate the operation of the grace period and may be involved with the individual management of the secure applications. For example, once the proper credentials are provided, the management application may set the grace period timer. As another example, the application management may have access to one or more operational policies stored on the computing device or at some other suitable component to place performance restrictions on an individual application.

Such an arrangement, however, may require some inter-process communications among the management application and the secure applications. This may present an obstacle in some platforms, and solutions are needed to realize the features described herein. For example, in iOS, a mobile operating system developed by Apple, Inc. of Cupertino, Calif., applications are sandboxed, meaning they are generally isolated from one another and communications between applications are restricted.

Figure 15:
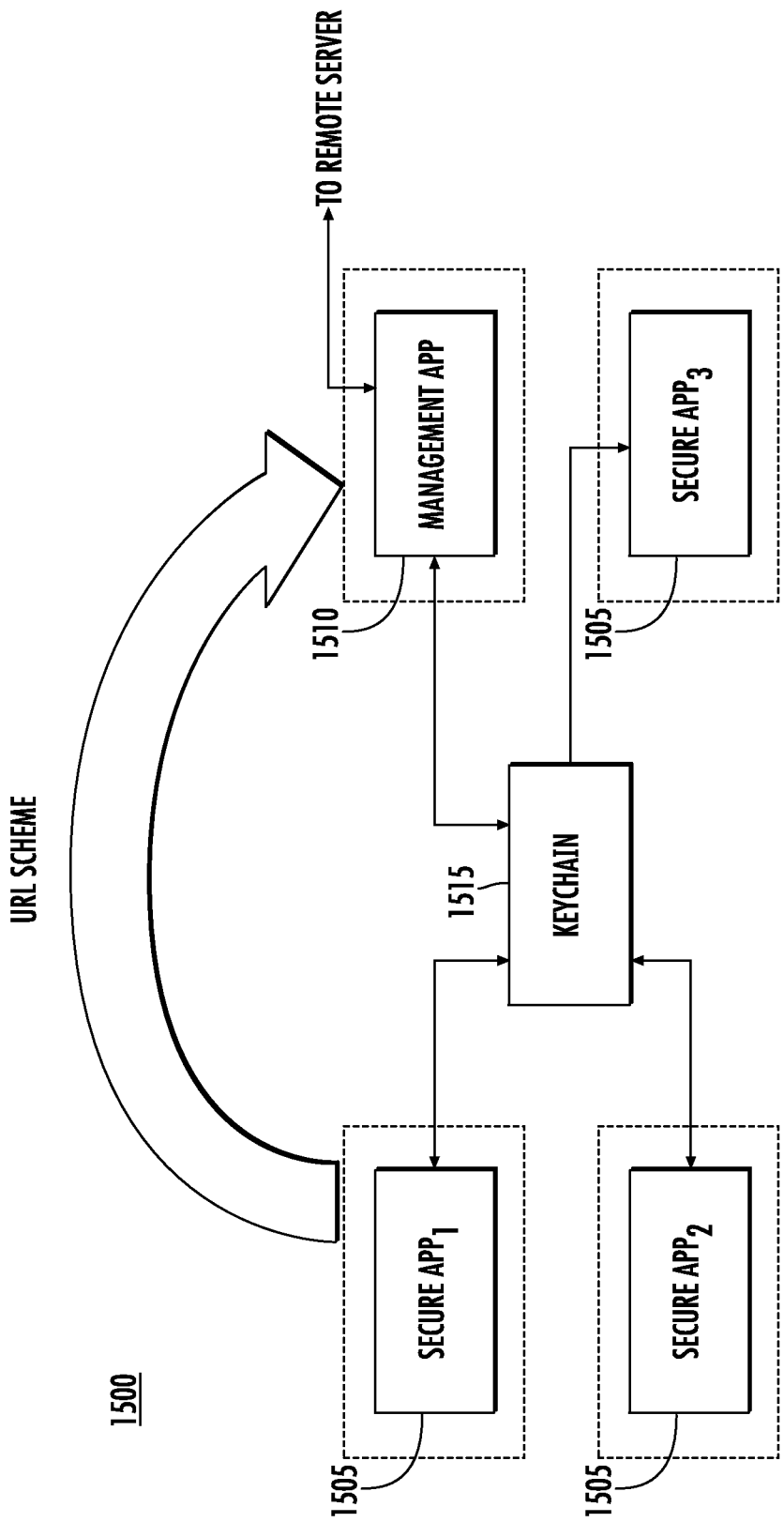
FIG. 15 illustrates an example of a system that includes several elements that may be part of a computing device.

Referring to FIG. 15, a system 1500 that shows representations of several elements that may be part of a single partition computing device is presented. Here, several secure applications 1505 are shown, with subscript numbers provided to help distinguish them. A management application 1510 is also pictured here, and a keychain database 1515 can be part of the system 1500. The dashed boxes that circumscribe the secure applications 1505 and the management application 1510 represent the concept of sandboxed applications.

The keychain database 1515 can be a container that stores any suitable type of data associated with an application, and the data is typically encrypted. Generally speaking, in a mobile environment, an application that stores data in the keychain 1515 can only access its data; that is, an application cannot access data in the keychain that is associated with another application. In one arrangement, however, a keychain group can be established to allow for the sharing of data among applications through the keychain 1515. For example, a developer may produce a family of applications, such as the secure applications 1505 and the management application 1510 shown here. When creating the identification of the secure applications 1505 and the management application 1510 that make up this family, a common bundle seed identification can be employed. As such, the keychain 1515 can be used to, for example, exchange messages between the management application 1510 and one or more secure applications 1505. In addition, messages can be exchange among multiple secure applications 1505 and among multiple secure applications 1505 and the management application 1510.

In addition to the keychain service, uniform resource locator (URL) schemes can be employed to facilitate communications between applications. For example, applications can use specially formatted URLs to vend services to one another, such as a maps application supporting URLs for displaying a particular map. In platforms like iOS, applications that are in the background typically are not executing code. In the setting shown in FIG. 15, the management application 1510 may be in the background or may be completely terminated, and a URL scheme can be used to re-direct a process to the management application 1510. Several examples will now be presented.

For this example, one can assume that each of the secure applications 1505 and the management application 1510 are part of a keychain group and that a grace period of one minute is in place. If a user attempts to launch the first secure application 1505 (secure app₁), the first secure application 1505 can check with the keychain 1515 to see if there are any impediments to its launching. In this case, it may be necessary for a user to provide authentication credentials before having access to the first secure application 1505. As such, the first secure application 1505 can signal the management application 1510 through the relevant URL scheme, and the management application 1510, in response, can activate. In doing so, the user can be re-directed to the management application 1510, which can cause a credentials page to be presented to the user. In particular, the user may be required to provide a password or a biometric sample. Once the proper credentials are provided, the user can be provided with access to the first secure application 1505.

In addition, the management application 1510 can provide a timer notification in the keychain 1515. Thus, if the user closes the first secure application 1505 and attempts to launch it again, the first secure application 1505 can access the keychain 1515 and can determine if the grace period has expired. If it has not, then the first secure application 1505 can be launched again without the user providing the necessary credentials. If, however, the grace period has expired, the first secure application 1505 can repeat the URL scheme above, and the user can be re-directed to provide the credentials. To assist in this feature, the first secure application 1505 can provide an update to the timer notification that can reflect the time at which the first secure application 1505 was closed, thereby resetting the grace period timer.

As an option, the grace period can apply to at least some of or each of the secure applications 1505 in the keychain group. For example, if the user closes out the first secure application 1505 and attempts to launch the second secure application 1505 (secure app₂), the second secure application 1505 can check the keychain 1515 to determine if the grace period associated with the initial use of the first secure application 1505 has expired. If it has not, then the second secure application 1505 can be launched without the user having to again provide the credentials. If it has expired, the second secure application 1505 can employ the URL scheme to re-direct the user to the management application 1510 to provide the credentials. In addition, if the user launches the management application 1510 directly and provides the credentials, the management application 1510 can provide the timer notification to the keychain 1515, and the secure applications 1505 may refer to this notification to determine whether the grace period has expired.

As an option, the keychain 1515 can also be used to facilitate the individual management of the secure applications 1505. For example, a developer, an administrator or some other entity may place a restriction on the operation of the first secure application 1505 in that the application 1505 cannot launch if the computing device is outside of a predetermined location. If the device is indeed detected outside the authorized location, the management application 1510 can provide a restriction message to the keychain 1515 that is intended for first secure application 1505. If the user attempts to launch the first secure application 1505, then the first secure application 1505 can check the keychain 1515 and can determine, through the restriction message, that the first secure application 1505 cannot launch. The launch can be aborted, and the user can be provided with an appropriate notification. If the computing device re-enters the authorized location, the management application 1510 or some other process can deliver a message to the keychain 1515 that overrides the restriction message, thereby enabling the operation of the relevant secure applications 1505. Other management functions can be imposed on the secure applications 1505 through this message scheme, including any of those previously described. For example, messages for whitelisting or blacklisting a secure application 1505 based on time, location, network connection, etc. and for revoking the same can be delivered through the keychain 1515.

The keychain and operational restrictions can be from the securitization of the applications, as previously described. That is, one or more hooks that result from this process can cause the secure application 1505 to access messages or other communications from the keychain 1515. This exemplary and non-limiting technique can open up multiple ways to individually manage a secure application 1515, including the process of using a single passcode or other authorization mechanism to access multiple secure applications without having to constantly re-enter such authenticating information.

While various embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A method of operating an enterprise application, comprising:
   receiving a request to activate the enterprise application through an input device of a computing device;
   in response to the receipt of the request, forcing a management directive on the enterprise application on an individual basis during its operation, wherein forcing the management directive on the enterprise application occurs with no modifications to source code of the enterprise application;
   wherein forcing the management directive on the enterprise application on an individual basis during its operation comprises:
      imposing a virtual private network (VPN) connection on the enterprise application; and
      enabling a tracking and recording of an amount of incoming or outgoing data used by the enterprise application.

2. The method according to claim 1, operating a management application installed on the computing device, wherein the management application is configured to facilitate the forcing of the management directive on the enterprise application on an individual basis.

3. The method according to claim 1, wherein the enterprise application is a secure application that is part of an enterprise workspace that is configured on the computing device.

4. The method according to claim 1, wherein forcing the management directive on the enterprise application on an individual basis during its operation comprises encrypting or decrypting the incoming or outgoing data used by the enterprise application.

5. The method according to claim 1, further comprising receiving a remote command for enabling the tracking and recording of the amount of incoming or outgoing data used by the enterprise application.

6. The method according to claim 1, wherein forcing the management directive on the enterprise application on an individual basis during its operation further comprises requiring authentication of a user of the enterprise application as a requirement for operating the enterprise application.

7. The method according to claim 1, wherein the VPN connection that is imposed on the enterprise application is in lieu of any other network connection configuration imposed overall on the computing device.

8. The method according to claim 1, wherein forcing the management directive on the enterprise application on an individual basis during its operation does not interfere with personal data or personal applications belonging to a user of the computing device, wherein the personal data is installed on the computing device.

9. A computing device for managing an enterprise application installed on the computing device, wherein a management application is also installed on the computing device, comprising:
an input device that is configured to receive a request to operate the enterprise application; and
a processing unit that is communicatively coupled to the input device, wherein the processing unit to configured to:
via the management application, force an override of the enterprise application by imposing a management directive individually on the enterprise application during operation of the enterprise application;
wherein the processing unit is further configured to, via the management application, force the override of the enterprise application by imposing the management directive individually on the enterprise application during operation of the enterprise application by:
causing a virtual private network (VPN) connection to be used as a network connection of the enterprise application; and
causing a tracking and recording of an amount of data used by the enterprise application process to be enabled.

10. The computing device according to claim 9, wherein the computing device includes a secure workspace and a personal workspace, wherein the enterprise application is a secure application that is part of the secure workspace and the personal workspace includes non-secure applications that are restricted from exchanging data with the secure application.

11. The computing device according to claim 9, wherein the processing unit is further configured to, via the management application, force the override of the enterprise application by imposing the management directive individually on the enterprise application during operation of the enterprise application by:
causing encryption or decryption of the data used by the enterprise application; or
causing an authentication of a user of the enterprise application to be performed prior to operation of the enterprise application.

12. The computing device according to claim 11, wherein the processing unit is further configured to selectively apply a grace period such that the performance of the authentication of the user of the enterprise application prior to operation of the enterprise application is selectively waived.

13. A computing device that has at least one enterprise application and personal application installed thereon and provides a number of system application programming interfaces (API) for interaction with applications, comprising:
an input device that is configured to receive a request to operate the enterprise application; and
a processing unit that is communicatively coupled to the input device, wherein the processing unit to configured to:
cause an imposition of a management configuration individually on the enterprise application during operation of the enterprise application while still permitting the enterprise application to call the system APIs;
wherein the processing unit is further configured to cause the imposition of the management configuration individually on the enterprise application during operation of the enterprise application by causing a monitoring of an amount of data used by the enterprise application process to be enabled.

14. The computing device according to claim 13, wherein the processing unit is further configured to cause the imposition of the management configuration individually on the enterprise application during operation of the enterprise application by limiting the imposition to the enterprise applications installed on the computing device.

15. The computing device according to claim 13, wherein the processing unit is further configured to cause the imposition of the management configuration individually on the enterprise application during operation of the enterprise application by causing the imposition of a virtual private network (VPN) connection on the enterprise application in lieu of any other network connection configuration that is applied overall to the computing device.

16. The computing device according to claim 15, wherein the processing unit is further configured to cause the imposition of the management configuration individually on the enterprise application during operation of the enterprise application by causing encryption or decryption of the data used by the enterprise application.

17. The computing device according to claim 13, wherein a management application is also installed on the computing device and the management application, in conjunction with the processing unit, facilitates the imposition of the management configuration individually on the enterprise application during operation of the enterprise application.

18. The computing device according to claim 13, wherein the enterprise application is a secure application that is part of an enterprise workspace that is part of the computing device and the personal applications are part of a personal workspace that is part of the computing device.

19. A method of managing an enterprise application installed on a computing device, wherein personal applications are also installed on the computing device, comprising:
receiving a remote command at the computing device, wherein the remote command is configured to set a management configuration for enforcement against the enterprise application without impacting the personal applications;

receiving a request to activate the enterprise application through an input device of the computing device; and in response to the receipt of the request, imposing the management configuration on the enterprise application by forcing a virtual private network (VPN) connection on the enterprise application on an individual basis.

20. The method according to claim 19, further comprising, in response to the receipt of the request, imposing the management configuration on the enterprise application during its operation by enabling the tracking of an amount of data consumed by the enterprise application.

21. The method according to claim 19, wherein the computing device provides a number of system application programming interfaces (API) for interaction with applications and imposing the management configuration on the enterprise application still permits the enterprise application to call the system APIs.

22. The method according to claim 19, wherein the individual VPN connection for the enterprise application is in lieu of any other network connection configuration that is applied overall to the computing device.

23. The method according to claim 19, wherein the enterprise application is a secure application that is part of an enterprise workspace that restricts data exchange between the enterprise application and the personal applications.

\* \* \* \* \*